(12) United States Patent
Johnson et al.

(10) Patent No.: US 8,603,392 B2
(45) Date of Patent: *Dec. 10, 2013

(54) ELECTROLYZED WATER SYSTEM

(75) Inventors: Jenna Johnson, Minneapolis, MN (US);
Kim R. Smith, Woodbury, MN (US);
Erik C. Olson, Savage, MN (US);
Steven E. Lentsch, St. Paul, MN (US)

(73) Assignee: Ecolab USA Inc., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/531,775

(22) Filed: Jun. 25, 2012

(65) Prior Publication Data

US 2012/0291800 A1 Nov. 22, 2012

Related U.S. Application Data

(60) Continuation-in-part of application No. 13/292,598, filed on Nov. 9, 2011, now Pat. No. 8,343,380, which is a division of application No. 12/974,520, filed on Dec. 21, 2010, now Pat. No. 8,114,344.

(51) Int. Cl.
*C23F 11/12* (2006.01)
*C23F 11/173* (2006.01)
*C23F 11/18* (2006.01)
*C23F 11/06* (2006.01)
*C01B 11/06* (2006.01)

(52) U.S. Cl.
USPC ..... 422/7; 252/389.52; 252/396; 252/400.52; 252/400.61; 252/400.62; 252/407; 252/187.28; 252/187.25; 252/187.24; 252/187.27; 252/187.29; 252/187.3; 252/389.61; 205/466; 205/556; 205/746; 205/756; 205/563; 205/265

(58) Field of Classification Search
USPC ............... 422/7; 252/389.52, 389.61, 389.62, 252/396, 400.52, 400.61, 400.62, 407, 252/187.24, 187.25, 187.26, 187.27, 252/187.28, 187.29, 187.3, 0.2; 205/466, 205/556, 746, 756, 563, 265
See application file for complete search history.

(56) References Cited

U.S. PATENT DOCUMENTS 2,121,501 A 6/1938 Hershman
2,155,046 A 4/1939 Griffith et al.
(Continued)

FOREIGN PATENT DOCUMENTS

EP GB 1 039 966 8/1966
EP 0 317 066 A2 5/1989
(Continued)

OTHER PUBLICATIONS

International Search Report mailed Sep. 14, 2011, Ecolab USA Inc., PCT/IB/2011/050100, filed Jan. 10, 2011.
Abd El-Maksoud, S. A., et al., "Electrochemical behaviour of low carbon steel in gluconate and tartarate solutions" Electrochimica Acta 50 (2005), pp. 1985-1991.
JP 1129601—Mitsubishi Gas Chem. Co., Inc.—English Abstract.
JP 2000-571—Organo KK—English Abstract.
JP 2001-310187—Kurita Water Ind. Ltd.—English Abstract.
JP 2008-259961—Kurita Water Ind. Ltd.—English Abstract.

*Primary Examiner* — Joseph D Anthony
(74) *Attorney, Agent, or Firm* — McKee, Voorhees & Sease, P.L.C.

(57) ABSTRACT

Corrosion-inhibited hypochlorite compositions and methods of use are disclosed. Corrosion inhibitors including sugar acids and calcium compounds, polyacrylate and calcium compounds, and/or zinc and calcium compounds are used with hypochlorite sources to enhance the longevity and performance of electrochemical cells as well as reducing corrosion of metal in contact with the generated hypochlorite sources. The methods for generation employ a variety of electrochemical cells, beneficially including use of portable electrochemical cell system for production of corrosion-inhibited hypochlorite cleaning solutions.

25 Claims, 8 Drawing Sheets

(56) References Cited

U.S. PATENT DOCUMENTS

| | | | | |
|---|---|---|---|---|
| 2,977,313 | A | 3/1961 | Roland | |
| 3,254,952 | A | 6/1966 | Raleigh et al. | |
| 3,440,024 | A | 4/1969 | Faust et al. | |
| 3,740,187 | A | 6/1973 | Kowalski | |
| 3,965,027 | A | 6/1976 | Boffardi et al. | |
| 3,990,983 | A | 11/1976 | Lamberti | |
| 4,071,605 | A | 1/1978 | Wojtowicz | |
| 4,087,360 | A | 5/1978 | Faust et al. | |
| 4,164,477 | A | 8/1979 | Whitley | |
| 4,248,690 | A | 2/1981 | Conkling | |
| 4,451,376 | A | 5/1984 | Sharp | |
| 4,471,789 | A | 9/1984 | Boden | |
| 4,561,982 | A | 12/1985 | Kuriyama et al. | |
| 4,664,836 | A | 5/1987 | Taylor, Jr. et al. | |
| 4,909,986 | A | 3/1990 | Kobayashi et al. | |
| 4,936,987 | A | 6/1990 | Persinski et al. | |
| 4,992,195 | A | 2/1991 | Dolan et al. | |
| 5,006,339 | A * | 4/1991 | Bargery et al. | 424/404 |
| 5,047,168 | A | 9/1991 | Broze et al. | |
| 5,089,162 | A | 2/1992 | Rapisarda et al. | |
| 5,104,584 | A | 4/1992 | Kong | |
| 5,111,934 | A * | 5/1992 | Morin | 206/229 |
| 5,346,641 | A | 9/1994 | Argo et al. | |
| 5,389,284 | A | 2/1995 | van der Hoeven et al. | |
| 5,468,411 | A | 11/1995 | Dixit et al. | |
| 5,529,711 | A | 6/1996 | Brodbeck et al. | |
| 5,547,612 | A | 8/1996 | Austin et al. | |
| 5,599,781 | A | 2/1997 | Haeggberg et al. | |
| 5,616,234 | A | 4/1997 | Rhees et al. | |
| 5,656,584 | A | 8/1997 | Angell et al. | |
| 5,688,756 | A | 11/1997 | Garabedian, Jr. et al. | |
| 5,695,679 | A | 12/1997 | Christie et al. | |
| 5,728,665 | A | 3/1998 | Choy et al. | |
| 5,731,276 | A | 3/1998 | Argo et al. | |
| 5,750,070 | A | 5/1998 | Tang et al. | |
| 5,776,874 | A | 7/1998 | MacBeath et al. | |
| 5,783,540 | A | 7/1998 | Secemski et al. | |
| 5,851,421 | A | 12/1998 | Choy et al. | |
| 5,885,954 | A | 3/1999 | Chicarielli | |
| 5,902,781 | A | 5/1999 | Painter | |
| 5,912,218 | A | 6/1999 | Chatterjee et al. | |
| 5,929,008 | A | 7/1999 | Goldstein | |
| 5,929,011 | A | 7/1999 | Scepanski | |
| 5,967,157 | A | 10/1999 | Chatterjee et al. | |
| 5,968,408 | A | 10/1999 | Anderson et al. | |
| 6,093,343 | A | 7/2000 | Addison et al. | |
| 6,143,707 | A | 11/2000 | Trinh et al. | |
| 6,146,538 | A | 11/2000 | Martin | |
| 6,365,101 | B1 | 4/2002 | Nguyen et al. | |
| 6,387,862 | B2 | 5/2002 | Busch et al. | |
| 6,616,739 | B1 | 9/2003 | Spanos | |
| 6,623,695 | B2 | 9/2003 | Malchesky et al. | |
| 6,664,289 | B2 | 12/2003 | Hansen | |
| 6,712,949 | B2 * | 3/2004 | Gopal | 205/466 |
| 6,761,815 | B2 * | 7/2004 | Nakajima et al. | 205/466 |
| 6,767,447 | B2 * | 7/2004 | Uno et al. | 205/466 |
| 6,773,575 | B2 * | 8/2004 | Nakajima et al. | 205/466 |
| 6,776,926 | B2 | 8/2004 | Martin | |
| 6,863,830 | B1 | 3/2005 | Purdy et al. | |
| 6,921,743 | B2 | 7/2005 | Scheper et al. | |
| 7,008,600 | B2 * | 3/2006 | Katsigras et al. | 422/292 |
| 7,041,628 | B2 | 5/2006 | Sunder et al. | |
| 7,078,462 | B2 | 7/2006 | Speed et al. | |
| 7,090,753 | B2 | 8/2006 | Sumita | |
| 7,238,272 | B2 | 7/2007 | Sano | |
| 7,241,726 | B2 | 7/2007 | Song et al. | |
| 7,243,664 | B2 | 7/2007 | Berger et al. | |
| 7,452,853 | B2 | 11/2008 | Smith et al. | |
| 7,517,847 | B2 | 4/2009 | Catalfamo et al. | |
| 7,537,705 | B2 | 5/2009 | Mizuno et al. | |
| 7,618,527 | B2 | 11/2009 | Schussler et al. | |
| 7,709,434 | B2 | 5/2010 | Smith et al. | |
| 7,741,262 | B2 | 6/2010 | Smith et al. | |
| 7,759,299 | B2 | 7/2010 | Smith et al. | |
| 7,816,314 | B2 | 10/2010 | Scheper et al. | |
| 7,960,329 | B2 | 6/2011 | Smith et al. | |
| 8,021,493 | B2 | 9/2011 | Smith et al. | |
| 8,105,531 | B1 * | 1/2012 | Smith et al. | 422/7 |
| 8,114,343 | B1 * | 2/2012 | Smith et al. | 422/7 |
| 8,114,344 | B1 * | 2/2012 | Smith et al. | 422/7 |
| 8,343,380 | B2 * | 1/2013 | Smith et al. | 252/389.61 |
| 8,394,253 | B2 * | 3/2013 | Peters et al. | 205/499 |
| 2001/0031249 | A1 * | 10/2001 | Oku et al. | 424/65 |
| 2002/0169091 | A1 | 11/2002 | Clare et al. | |
| 2003/0063998 | A1 | 4/2003 | Ghosh et al. | |
| 2003/0213503 | A1 | 11/2003 | Price et al. | |
| 2003/0213505 | A1 | 11/2003 | Price et al. | |
| 2003/0220214 | A1 | 11/2003 | Ofosu-Asante et al. | |
| 2004/0086463 | A1 | 5/2004 | Hansen | |
| 2004/0235680 | A1 | 11/2004 | Lawrence et al. | |
| 2005/0075257 | A1 | 4/2005 | Scheper et al. | |
| 2005/0211567 | A1 | 9/2005 | Fleming | |
| 2005/0239678 | A1 | 10/2005 | Nakanishi et al. | |
| 2005/0252532 | A1 | 11/2005 | Gray et al. | |
| 2005/0252538 | A1 | 11/2005 | Vernon et al. | |
| 2006/0094634 | A1 | 5/2006 | Jekel et al. | |
| 2006/0096618 | A1 | 5/2006 | Price et al. | |
| 2006/0116309 | A1 | 6/2006 | Lambotte et al. | |
| 2006/0122089 | A1 | 6/2006 | Lambotte et al. | |
| 2006/0163085 | A1 | 7/2006 | Hanaoka | |
| 2007/0095760 | A1 * | 5/2007 | Girvan et al. | 210/696 |
| 2007/0138020 | A1 | 6/2007 | Balagopal et al. | |
| 2007/0158067 | A1 | 7/2007 | Xiao et al. | |
| 2007/0185295 | A1 | 8/2007 | Rodrigues et al. | |
| 2007/0261723 | A1 | 11/2007 | Price et al. | |
| 2008/0108537 | A1 | 5/2008 | Rees | |
| 2008/0145271 | A1 | 6/2008 | Kidambi | |
| 2008/0263778 | A1 | 10/2008 | Baars et al. | |
| 2008/0287335 | A1 | 11/2008 | Smith | |
| 2008/0300160 | A1 | 12/2008 | Smith et al. | |
| 2009/0105111 | A1 | 4/2009 | Stolte et al. | |
| 2009/0148342 | A1 | 6/2009 | Bromberg et al. | |
| 2009/0209490 | A1 | 8/2009 | Nakanishi et al. | |
| 2010/0140544 | A1 | 6/2010 | Smith et al. | |
| 2010/0173820 | A1 | 7/2010 | Smith et al. | |
| 2011/0067732 | A1 * | 3/2011 | Smith et al. | 134/10 |
| 2011/0168567 | A1 * | 7/2011 | Smith et al. | 205/350 |
| 2012/0156313 | A1 * | 6/2012 | Smith et al. | 424/663 |
| 2012/0247970 | A1 * | 10/2012 | Olson et al. | 205/508 |
| 2012/0273374 | A1 * | 11/2012 | Olson et al. | 206/232 |
| 2012/0291800 | A1 * | 11/2012 | Johnson et al. | 134/3 |

FOREIGN PATENT DOCUMENTS

| | | |
|---|---|---|
| EP | 0 425 283 A2 | 5/1991 |
| EP | 0 518 720 A1 | 12/1992 |
| EP | 0 594 314 A1 | 4/1994 |
| EP | 0 723 006 A2 | 7/1996 |
| EP | 1 348 755 A3 | 10/2003 |
| EP | 1 588 617 A1 | 10/2005 |
| EP | 1 598 465 A1 | 11/2005 |
| EP | 1 598 467 A1 | 11/2005 |
| EP | 1 598 468 A1 | 11/2005 |
| EP | 1 598 469 A1 | 11/2005 |
| EP | 1 598 470 A1 | 11/2005 |
| EP | 1 598 471 A1 | 11/2005 |
| EP | 1 605 089 A1 | 12/2005 |
| EP | 1 673 974 A1 | 6/2006 |
| JP | 1129601 | 2/1999 |
| JP | 2000-571 A | 1/2000 |
| JP | 2001-310187 A | 11/2001 |
| JP | 2008-259961 | 10/2008 |
| WO | WO 94/00545 A1 | 1/1994 |
| WO | WO 94/03574 A1 | 2/1994 |
| WO | WO 94/17170 A1 | 8/1994 |
| WO | WO 95/12652 A1 | 5/1995 |
| WO | WO 2005/011760 A1 | 2/2005 |
| WO | WO 2005/093129 A1 | 10/2005 |
| WO | WO 2005/116319 A1 | 12/2005 |
| WO | WO 2007/109327 A2 | 9/2007 |
| WO | WO 2008/155755 A1 | 12/2008 |

* cited by examiner

ELECTROLYZED WATER SYSTEM

CROSS-REFERENCE TO RELATED APPLICATIONS

This application is Continuation-in-Part of U.S. Ser. No. 13/292,598 filed Nov. 9, 2011, entitled Corrosion Inhibition of Hypochlorite Solutions Using Sugar Acids and Ca, now U.S. Pat. No. 8,343,380 issued on Jan. 1, 2013, which is a Divisional Application of U.S. Ser. No. 12/974,520 filed Dec. 21, 2010, now U.S. Pat. No. 8,114,344 issued on Feb. 14, 2012. The entire contents of these patents and patent applications are hereby expressly incorporated herein by reference including, without limitation, the specification, claims, and abstract, as well as any figures, tables, or drawings thereof This application is also related to U.S. Ser. No. 12/974,468 filed on Dec. 21, 2010, now U.S. Pat. No. 8,114,343 issued Feb. 14, 2012, entitled Corrosion Inhibition of Hypochlorite Solutions Using Zn and Ca, and U.S. Ser. No. 12/974,560 filed Dec. 21, 2010, now U.S. Pat. No. 8,105,531 issued on Jan. 31, 2012, entitled Corrosion Inhibition of Hypochlorite Solutions Using Polyacrylate and Ca. The entire contents of these patents and patent applications are hereby expressly incorporated herein by reference including, without limitation, the specification, claims, and abstract, as well as any figures, tables, or drawings thereof

FIELD OF THE INVENTION

The invention relates to improved electrolyzed water and its cleaning applications, including the use of corrosion inhibitor compositions and methods of using the same for portable electrochemical generation of corrosion-inhibited hypochlorite cleaning solutions. Corrosion inhibitors including sugar acids and calcium compounds, polyacrylate and calcium compounds, and/or zinc and calcium compounds are used with hypochlorite sources and have the beneficial effect of corrosion inhibition of metal in contact with hypochlorite sources used in various cleaning applications. Beneficially, methods for generating the improved cleaning composition are suitable for using a portable electrochemical cell system to generate corrosion-inhibited hypochlorite cleaning solutions.

BACKGROUND OF THE INVENTION

Sodium hypochlorite solutions are commonly used and highly effective as bleaches and sanitizers for cleaning a variety of surfaces. However, sodium hypochlorite solutions are extremely corrosive to many treated surfaces, in particular, metal surfaces become highly corroded. Hypochlorite solutions corrode surfaces as a result of its composition of sodium hypochlorite, sodium chloride and often sodium hydroxide, each having distinct mechanisms of corrosion. Sodium hypochlorite is a strong oxidant causing metal corrosion through a redox attack. Sodium chloride attacks and penetrates the passivation layer of metals, resulting in pitting of the surface. In addition, sodium hydroxide is corrosive to metals as a result of formation of metal hydroxide. Additional descriptions of the mechanisms of corrosion are disclosed in Corrosion Basics, National Association of Corrosion Engineers, 1984.

Electrolysis as a water treatment process can be used to produce hypochlorite cleaning solutions. It is well understood that electrolysis methods employ electricity entering a water source at a cathode and passes through the water, exiting through an anode. Hydrogen is collected at the cathode (negatively charged electrical current) and oxygen is collected at the anode (positively charged electrical current). The reaction of water in an electrolytic cell is a redox process, wherein an oxidation reaction occurs at the anode while a reduction reaction occurs at the cathode. Various types of conventional electrolysis cells and methods for electrolyzing water are known and disclosed, for example in U.S. Pat. Nos. 3,616,355, 4,062,754, 4,100,052, 4,761,208, 5,313,589, and 5,954,939. Such electrolysis cells are used for a variety of purposes. Depending upon the structure of an electrochemical cell and the input salt source, various effluents may be produced, including for example, hypochlorous acid, sodium hydroxide (caustic) and hypochlorite (sodium hypochlorite, commonly referred to as bleach).

The on-site production of chlorine-containing oxidant products such as sodium hypochlorite, hypochlorous acid, chlorine and/or $Cl_2$ from aqueous sodium chloride solutions are desirable, as production from an electrolyzed water process prevents the need to transport diluted aqueous solutions of the corrosive products such as hypochlorite or difficult to transport corrosive and flammable gases such as chlorine gas. Such products produced from an electrolyzed water process may be referred to herein as "electrolyzed water products." Alternatively, electrolysis cells may be used to generate alkaline sources, such as potassium hydroxide and potassium sulfate through electrolyzing sodium sulfate. See e.g., U.S. Pat. No. 6,375,824.

The effectiveness and convenience of utilizing electrolysis systems are frequently limited due to the failure of the electrodes and membranes of the cells caused by corrosion and/or hard water scaling. The longevity of the electrodes and membranes of the cells are significantly diminished when scaling and/or corrosion are observed in the cell. There remains a significant need to inhibit fouling of electrochemical cells in order to prolong the lifetime of an electrochemical system. There is also'great demand for high-economic-efficiency operation conditions for improved electrolysis systems.

It is an objective of the claimed invention to incorporate corrosion inhibitor compositions to improved electrolyzed water products in order to prevent all corrosive mechanisms of sodium hypochlorite solution on metal surfaces.

A further object of the claimed invention is an improved electrolyzed water product containing a corrosion inhibitor composition capable of preventing metal corrosion caused by sodium hypochlorite solutions without adversely impacting the stability of the hypochlorite solution.

A further object of the invention is to provide methods for improved hypochlorite generation using electrolysis in a variety of electrochemical cells, including portable electrochemical cells for onsite generation of smaller quantities of hypochlorite for a variety of cleaning applications.

BRIEF SUMMARY OF THE INVENTION

Unexpectedly, the present invention provides compositions and methods of use that synergistically reduce corrosion of metal surfaces treated with hypochlorite bleach solutions or other hypochlorous sources generated from an electrochemical cell. An advantage of the invention is a corrosion inhibitor composition that simultaneously prevents the corrosive mechanisms of hypochlorite solutions on treated surfaces. It is an advantage of the present invention that the claimed methods and compositions prevent substrate corrosion caused by hypochlorite solutions without adversely impacting the stability of the hypochlorite solution. The methods and compositions of the invention are particularly well suited for use with portable electrochemical cells for onsite generation of smaller quantities of hypochlorite for a variety of cleaning applications.

In an aspect of the invention, a corrosion-inhibited hypochlorous stream from an electrochemical cell is provided. The composition comprises: a hypochlorous stream, wherein said hypochlorous stream is obtained from an electrochemical cell; and a corrosion inhibitor comprising a water soluble calcium compound and a corrosion inhibitor selected from the group consisting of water soluble polyacrylate compound, water soluble zinc salt and a sugar acid; wherein the pH of said composition is at least about 7 and wherein the ratio of said hypochlorous source to corrosion inhibitor is from about 10:1 to about 600:1.

In a further aspect of the invention, a corrosion-inhibited hypochlorous stream from an electrochemical cell is provided and comprises: a hypochlorous stream, wherein said hypochlorous stream is obtained from an electrochemical cell and comprises sodium hypochlorite, wherein said hypochlorite source is free of carbonate and bicarbonate anions; and about 0.01 to about 2 wt-% corrosion inhibitor comprising a water soluble calcium salt and a corrosion inhibitor selected from the group consisting of a water soluble, non-thickening polymeric salt having a molecular weight less than about 10,000, a water soluble zinc salt, and a sugar acid; wherein the pH of said composition is at least about 7, the ratio of said hypochlorite source to corrosion inhibitor is from about 50:1 to about 200:1, and wherein the ratio of said corrosion inhibitor to said calcium salt is from about 6:1 to about 1:6.

In a still further aspect of the invention, a method for cleaning using a corrosion-inhibited hypochlorous stream from an electrochemical cell is provided. The methods may include the following steps: adding a corrosion inhibitor to an electrochemical cell or to an effluent stream of an electrochemical cell to generate a corrosion-inhibited hypochlorous concentrate or use solution, wherein said corrosion inhibitor concentration is from about 25 ppm to about 3000 ppm, and wherein said corrosion inhibitor comprises a water soluble calcium salt and a corrosion inhibitor selected from the group consisting of a water soluble, non-thickening polymeric salt having a molecular weight less than about 10,000, a water soluble zinc salt, and a sugar acid; and contacting a surface with said corrosion inhibitor concentrate or use solution, wherein said composition inhibits the corrosion of said surface in the presence of said hypochlorous source.

An additional aspect of the invention provides a method for generating corrosion-inhibited hypochlorous source comprising: obtaining an electrochemical cell for production of a hypochlorous source; providing a water and a sodium chloride source to the electrochemical cell; adding a corrosion inhibitor to an electrochemical cell or to an effluent stream of an electrochemical cell to generate a corrosion-inhibited hypochlorous source having a corrosion inhibitor concentration from about 25 ppm to about 3000 ppm, wherein said corrosion inhibitor comprises a water soluble calcium salt and a corrosion inhibitor selected from the group consisting of a water soluble, non-thickening polymeric salt having a molecular weight less than about 10,000, a water soluble zinc salt, and a sugar acid; and applying an electric current to the electrochemical cell.

Figure 1:
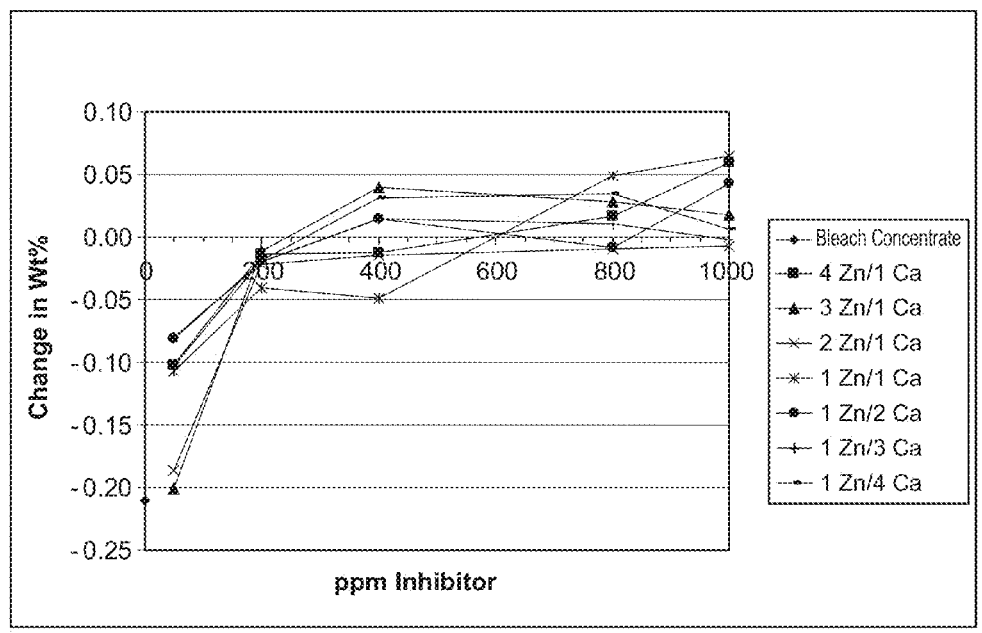
FIG. 1 shows data from Example 3 in the form of a graph illustrating the effect of zinc/calcium corrosion inhibitor concentration ratio on the corrosiveness of a bleach concentrate.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular corrosion inhibitor compositions and methods of using the same in various electrochemical cells, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

As used herein, "agricultural" or "veterinary" objects or surfaces include animal feeds, animal watering stations and enclosures, animal quarters, animal veterinarian clinics (e.g. surgical or treatment areas), animal surgical areas, and the like.

The term "bleaching agent," as used herein can refer to agents used for example to sanitize, lighten or whiten a substrate, and may include bleaching compounds capable of liberating an active halogen species, such as $Cl_2$, $Br_2$, $I_2$, $ClO_2$, $BrO_2$, $IO_2$, $OCl^-$, $—OBr^-$ and/or, $—OI^-$, under conditions typically encountered during the cleansing process. Bleaching agents for use in the present invention include, for example, chlorine-containing compounds such as a chlorite or a hypochlorite.

The terms "chelating agent" and "sequestrant" as used herein, refer to a compound that forms a complex (soluble or not) with water hardness ions in a specific molar ratio. Chelating agents that can form a water soluble complex include for example, sodium tripolyphosphate, EDTA, DTPA, NTA, citrate, and the like. Sequestrants that can form an insoluble complex include for example, sodium triphosphate, zeolite A, and the like.

The term "chlorine-containing oxidant," as used herein, refers to oxidants produced according to electrolysis methods of sodium hydroxide solutions and may include for example, inorganic hypochlorite salts (such as sodium hypochlorite), hypochlorous acid, chlorine and $Cl_2$ (gas).

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface," as used herein, includes surfaces including, for example, showers, sinks, toilets, bathtubs, countertops, windows, mirrors, transportation vehicles, floors, and the like.

The term "hard water," as used herein, refers to water having a level of calcium and magnesium ions in excess of about 100 ppm. Often, the molar ratio of calcium to magnesium in hard water is about 2:1 or about 3:1. Although most locations have hard water, water hardness tends to vary from one location to another. Further, as used herein, the term "solubilized water hardness" refers to hardness minerals dissolved in ionic form in an aqueous system or source, i.e., $Ca^{++}$ and $Mg^{++}$. Solubilized water hardness does not refer to hardness ions when they are in a precipitated state, i.e., when the solubility limit of the various compounds of calcium and magnesium in water is exceeded and those compounds precipitate as various salts such as, for example, calcium carbonate and magnesium carbonate. Salts formed from water hardness ions have low solubility in water as they are formed by metal cations interacting with inorganic anions. As concentration in a solution increases and/or temperature or pH of a water source increases, the salts will precipitate from solution, crystallize and form hard deposits or scales on surfaces, causing the undesirable effects on equipment such as electrochemical cells. A threshold inhibitor or threshold agent (as used synonymously) inhibits the crystallization of water hardness ions from solution, without necessarily forming a specific complex with the water hardness ion, thereby inhibiting the scaling, film and/or residue traditionally observed in cells. Not wishing to be limited by theory, it is believed that the threshold inhibitors work by interfering with the growth of the scale crystals.

The phrase "health care surface," as used herein, refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

The term "hypochlorite," as used herein, refers to a salt of hypochlorous acid. A hypochlorite ion is $ClO^-$ and therefore a hypochlorite compound is a chemical compound containing this group having a chlorine in the oxidation state (+1). The oxidative state results in very low stability, causing hypochlorites to be very strong oxidizing agents. One skilled in the art may recognize that other chlorine-containing bleaches such chlorate ions or even chlorine dioxide can be formed by modifying the pH or starting materials for an electrochemical cell. A common example of a hypochlorite is the bleaching agent sodium hypochlorite. As used herein, sodium hypochlorite (NaOCl) may be used interchangeably with hypochlorite. Hypochlorous acid is a more effective sanitizer than hypochlorite and is chemically preferred when the pH of a bleach solution is decreased. For purposes of describing the present invention, the description of the use of threshold agents for electrochemical cells producing hypochlorite shall also be understood to incorporate cells producing hypochlorous acid. For further purposes of the present invention, hypochlorite and hypochlorous acid shall also refer to a chlorine-containing oxidant as described herein.

In addition, the terms "hypochlorite," "hypochlorite solution," "sodium hypochlorite solution" and variations thereof, as used herein, refer to a mixture of sodium hypochlorite, sodium chloride, and optionally sodium hydroxide.

The term "instrument," as used herein, refers to the various medical or dental instruments or devices that can benefit from cleaning with a stabilized composition according to the present invention. The phrases "medical instrument", "dental instrument", "medical device", "dental device", "medical equipment", or "dental equipment" refer to instruments, devices, tools, appliances, apparatus, and equipment used in medicine or dentistry. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. For the purpose of this patent application, successful microbial reduction is achieved when the microbial populations are reduced by at least about 50%, or by significantly more thin is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

The terms "scale," "scaling," "film," and "filming" as used herein, may exemplarily refer to either bicarbonate, carbonate, sulfate, phosphate or hydroxide scaling, caused by salts of bicarbonate, carbonate, sulfate, phosphonate and/or hydroxide with calcium, magnesium, or other metal ions as observed in an electrochemical cell and described herein. Scaling as discussed herein and alleviated according to the threshold agent compositions and methods of the present invention are distinct from cell corrosion. Corrosion of an electrochemical cell generally refers to the gradual weight loss of metallic components through a chemical process or series of chemical reactions. Most often metals that come into prolonged contact with aqueous systems containing oxidants (such as chlorine, acid, bleach, caustic, etc.) are prone to corrosion. In an electrochemical cell, distinct from scaling, corrosion most frequently occurs at the anode due to the more acidic conditions.

As used in this invention, the term "sporicide" refers to a physical or chemical agent or process having the ability to cause greater than a 90% reduction (1-log order reduction) in the population of spores of *Bacillus cereus* or *Bacillus subtilis* within 10 seconds at 60° C. In certain embodiments, the sporicidal compositions of the invention provide greater than a 99% reduction (2-log order reduction), greater than a 99.99% reduction (4-log order reduction), or greater than a 99.999% reduction (5-log order reduction) in such population within 10 seconds at 60° C.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition The terms "threshold agent" and "threshold inhibiting agent," as used herein, refer to a compound that inhibits crystallization of water hardness ions from solution, but that need not form a specific complex with the water hardness ion. Threshold agents are capable of maintaining hardness ions in solution beyond its normal precipitation concentration. See e.g., U.S. Pat. No. 5,547,612. This distinguishes a threshold agent from a chelating agent or sequestrant; however, according to the invention the threshold agent may be either a chelating agent and/or sequestrant. Threshold agents may include, for example and without limitation, polycarboxylates, such as polyacrylates, polymethacrylates, olefin/maleic copolymers, and the like. The threshold agent according to the invention must survive the electrochemical cell's conditions to ensure it is not deactivated and prevented from inhibiting scaling, and further must not cause any decrease in chlorine generation. As used herein, the terms "chelating agent" and "sequestrant" refer to a compound that forms a complex (soluble or not) with water hardness ions (from the wash water, soil and substrates being washed) in a specific molar ratio. According to the invention, the threshold agent is preferably characterized as sub stoichiometric, such that the threshold agent is effective at concentration levels that are lower than would be expected based on a stoichiometric equivalence of the threshold agent and the scale-causing component present in the electrochemical cell or treated water source.

The terms "vehicle" or "car" as used herein, refer to any transportation conveyance including without limitation, automobiles, trucks, sport utility vehicles, buses, trucks, motorcycles, monorails, diesel locomotives, passenger coaches, small single engine private airplanes, corporate jet aircraft, commercial airline equipment, etc.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic.

Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The terms "water" and "feed water," as used herein, refer to any source of water that can be used with the methods and compositions according to the present invention. Exemplary water sources suitable for use as a feed water in the present invention include, but are not limited to, water from a municipal water source, or private water system, e.g., a public water supply or a well. The water can be city water, well water, water supplied by a municipal water system, water supplied by a private water system, and/or water directly from the system or well. The feed water can also include water from a used water reservoir, such as a recycle reservoir used for storage of recycled water, a storage tank, or any combination thereof. In some embodiments, the water source is not industrial process water. In other embodiments, the water source is not a waste water stream.

The term, "water soluble," as used herein, refers to a compound that can be dissolved in water at a concentration of more than about 1 wt-%. Alternatively, the terms "sparingly soluble" or "sparingly water soluble" refer to a compound that can be dissolved in water only to a concentration of about 0.1 to about 1.0 wt-%. The term "water insoluble" refers to a compound that can be dissolved in water only to a concentration of less than about 0.1 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Commercially-available corrosion inhibitors for non-metal surfaces, such as glass, often work by causing controlled precipitation of calcium salts and other hard water sources and/or preventing redeposition of hardness sources, in order to reduce etching and/or corrosion of treated surfaces. For example, calcium gluconate is a corrosion and/or etch inhibitor that may be combined with a magnesium, zinc and/or aluminum ion source. Further description of such etch and corrosion inhibition systems are disclosed in U.S. Pat. Nos. 7,709,434, 7,759,299, 7,919,448 and 7,960,329 and U.S. patent application Ser. No. 12/114,364, now U.S. Pat. No. 8,207,102 issued on Jun. 26, 2012, the disclosures of which are herein incorporated in its entirety. Such corrosion inhibitor compositions have been found to provide suitable etch protection to glass and soft metal surfaces, such as aluminum, against corrosive attack by alkalinity in warewash detergents. Examples of additional corrosion, salt deposit and scale-inhibitor systems known in the art, include for example U.S. Pat. No. 3,965,027 the disclosure of which is herein incorporated in its entirety.

Unlike the present invention, prior corrosion inhibitor systems are not incorporated directly into the highly corrosive hypochlorite bleach formulas and solutions. Accordingly, the compositions according to the present invention provide the benefit of anticorrosive effects traditionally observed when metal surfaces are contacted with hypochlorite solutions at concentrations often as low as about 100 ppm. The corrosion inhibitor compositions according to the invention are suitable for use in any application where it is desirable to reduce surface corrosion caused by such hypochlorite solutions. The anticorrosive effects are obtained at a rate of corrosion of a treated surfaces that is less than the rate of corrosion for an otherwise identical use solution of hypochlorite except for the absence of the corrosion inhibitor according to the invention.

Improved Electrolyzed Water Products—Hypochlorous Streams

According to an embodiment of the invention improved electrolyzed water products are produced. In particular, improved hypochlorous streams from electrochemical cells are provided. The improved electrolyzed water products beneficially incorporate a corrosion inhibitor that prevents various corrosion mechanisms resulting from hypochlorite sources. As a result, an improved output form an electrochemical cell is achieved. The benefits of the improved products result from various additives to the electrochemical cell and may include, for example improved cleaning, wetting, foaming, aesthetic properties, disinfectant properties, sanitizing properties, improved lifespan of the electrochemical cell, and/or reduced corrosion of surfaces treated with the product. In a preferred aspect of the invention, the additives to the electrochemical cell are a corrosion inhibitor package to provide a corrosion-inhibited hypochlorous source of stream from an electrochemical cell.

In a further aspect, the additives to the electrochemical cells produce an improved electrolyzed water product that does not interfere with the electrolysis reaction, are soluble in the feed stream (and/or suitable for use as a solid within the electrochemical cell), can be combined in either the feed stream of added separately into different chambers of a multi-chambered electrochemical cell, and/or may be permeable through a membrane of the electrochemical cell. These and other beneficial aspects of the improved electrolyzed water product and methods of generating the same are disclosed herein.

In additional aspects of the invention, improved hypochlorous cleaning products can include the addition of functional agents, such as additional corrosion inhibitor compositions (or an initial stream of the corrosion inhibitor compositions provided to an electrolyzed water source—such as hypochlorous—from an electrochemical cell).

Although not limiting to the present invention, it is believed that, in certain embodiments, the combined use of polyacrylate compounds, zinc compounds and/or sugar acids along with a water soluble calcium salt according to the invention, provides a mechanism of synergistic corrosion inhibition that is incorporated into a hypochlorite source generated from an electrochemical cell. The calcium compound forms a microscopic protective film on the surface of articles exposed to the present corrosion inhibitor composition. The protective film can be transparent or not visible to the unaided eye and functions as a protective layer to slow or prevent the corrosive hypochlorite solutions components, namely sodium hypochlorite, sodium chloride and often sodium hydroxide, from attacking and corroding the surface of the article via the different corrosive mechanisms. According to a theory of the invention, the film may function to allow the corrosive hypochlorite solution to attack and remove portions of the film, rather than attack the surface of the article. The combined use of the polyacrylate, zinc compound or sugar acid and water soluble calcium salt according provides further mechanism of corrosion inhibition that act in synergy.

In an aspect of the invention, the corrosion inhibitor composition is added to an electrochemical cell and/or an effluent stream containing a hypochlorous source in a concentration of about 0.001 wt-% to about 50 wt-%. In a preferred aspect, the corrosion inhibitor composition is added within the brine solution of an electrochemical cell and/or an effluent stream containing a hypochlorous source in a concentration of about 0.01 wt-% to about 30 wt-%, more preferably from about 0.1 wt-% to about 10 wt-%.

Polyacrylate Corrosion Inhibitor Compositions

According to an embodiment of the invention, a corrosion inhibitor composition is disclosed and comprises, consists of and/or consists essentially of a hypochlorite source and a corrosion inhibitor comprising both a polyacrylate compound and a calcium compound. The corrosion inhibitor package of a polyacrylate and calcium compound exhibits excellent corrosion inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the polyacrylate compound and calcium compound generate synergistic increases in corrosion inhibition caused by hypochlorite sources, compared to corrosion inhibition obtained with the use of either a polyacrylate compound or calcium compound alone.

The calcium compound according to the corrosion inhibitor compositions provides a source of calcium ions. Any water soluble calcium compounds that provide calcium ions may be used according to the invention. The sources of calcium ions can be provided as elemental metals, organic salts, inorganic salts, organic oxides, inorganic oxides or mixtures thereof. The sources of calcium ions can further be provided as an anhydrous compound or as a hydrated component.

According to an embodiment of the invention, the polyacrylate is a non-thickening polyacrylate. The polyacrylate compound may further be a polyacrylate derivative. Suitable polyacrylate compounds according to the invention are not effective as thickening agents, oxidizing agents and/or reducing agents. In addition, suitable polyacrylate compounds do not contain an anion that acts as a bleach catalyst.

According to an embodiment of the invention, the polyacrylate and calcium corrosion inhibitor package is preferably comprised of a water soluble polyacrylate salt (also referred to as a polymeric salt according to the invention) and a water soluble calcium salt. In addition, copolymers and homopolymers of the water soluble polyacrylate salts may be used for the corrosion inhibitor package. The water soluble polymeric salt and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and polymeric salts remain soluble in solution. In a further embodiment, the water soluble calcium and polymeric salts remain dispersed in solution.

According to an embodiment of the invention, the polymeric and calcium salts of the corrosion inhibitor composition have a chloride or non-halide anion. According to a preferred embodiment, the polymeric and calcium salts do not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. According to a further embodiment of the invention, the polymeric and calcium salts of the corrosion inhibiter are free of aluminum and magnesium ions.

Suitable water soluble polymeric salts according to the invention are not effective as thickening agents, oxidizing agents and/or reducing agents. In addition, suitable water soluble polymeric salts do not contain an anion or cation that acts as a bleach catalyst. Still further, oxidizing halogens and/or their hypohalous acids are not desirable for use according to the invention. Exceptionally suitable polymeric salts for the corrosion inhibitor composition include sodium polyacrylate, sodium methacrylate, a hydrate thereof, and a mixtures thereof or the like. The salts can be provided as hydrated salts or anhydrous salts.

Preferably, the polyacrylates and polymeric salts for the corrosion inhibitor composition according to the invention have a molecular weight of less than about 10,000, preferably less than about 7,000, and more preferably less than about 4,000. The molecular weight ranges of the preferred polyacrylates and polymeric salts for the corrosion inhibitor composition according to the invention correlate with the non-thickening properties of the polyacrylate corrosion inhibitors.

Zinc Corrosion Inhibitor Compositions

According to an embodiment of the invention, a corrosion inhibitor composition is disclosed and comprises, consists of and/or consists essentially of a hypochlorite source and a corrosion inhibitor comprising both a zinc compound and a calcium compound. The corrosion inhibitor package of a zinc and calcium compound exhibits excellent corrosion inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the zinc compound and calcium compound generate synergistic increases in corrosion inhibition caused by hypochlorite sources, compared to corrosion inhibition obtained with the use of either a zinc compound or calcium compound alone.

The zinc compound and calcium compound according to the corrosion inhibitor compositions provide a source of zinc and calcium ions. Any water soluble zinc and calcium compounds that provide zinc and calcium ions may be used according to the invention. The sources of each ion can be provided as elemental metals, organic salts, inorganic salts, organic oxides, inorganic oxides or mixtures thereof. The sources of each ion can further be provided as an anhydrous compound or as a hydrated component.

According to an embodiment of the invention, the zinc and calcium corrosion inhibitor package is preferably comprised of a water soluble zinc, salt and a water soluble calcium salt.

According to an embodiment of the invention, the water soluble zinc salt and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and zinc salts remain soluble in solution. In a further embodiment, the water soluble calcium and zinc salts remain dispersed in solution.

According to an embodiment of the invention, the zinc and calcium salts of the corrosion inhibitor composition have a chloride or non-halide anion. According to a preferred embodiment, the zinc and calcium salts do not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. According to a further embodiment of the invention, the zinc and calcium salts of the corrosion inhibiter are free of aluminum and magnesium ions.

Suitable water soluble zinc salts according to the invention are not effective as oxidizing agents or reducing agents. In addition, suitable water soluble zinc salts do not contain an anion that acts as a bleach catalyst. Still further, oxidizing halogens and/or their hypohalous acids are not desirable for use according to the invention. Zinc salts may include, for example, zinc acetate, zinc benzoate, zinc chlorate, zinc chloride, zinc dihydrogen phosphate, zinc formate, zinc gluconate, zinc glycerophosphate, zinc lactate, zinc metasilicate, zinc nitrate, zinc pantothenate, zinc phosphate, zinc salicylate, zinc succinate, zinc sulfate, a hydrate thereof, and a of a 2-ketose is oxidized. Uronic acids are those sugar acids where an aldose's or ketose's first hydroxyl group is oxidized. Finally, aldaric acids are those sugar acids with both ends of an aldose oxidized.

Suitable sugar acids according to the invention include the following nonlimiting examples, including ascorbic acid, gluconic acid, galaturonic acid, mucic acid, and glucaric acid. Both ascorbic acid and gluconic acid are particularly suitable sugar acids for use in the corrosion inhibitor package. As one skilled in the art shall ascertain, ascorbic acid may be considered a "vinyl"carboxylic acid with the double bond's electrons shared between the hydroxyl and the carbonyl moieties. There are two resonance structures for the deprotonated form, differing in the position of the double bond. Ascorbic acid might also be considered an enol. The deprotonated form would then be a strongly basic enolate with the adjacent double bond stabilizing the deprotonated form.

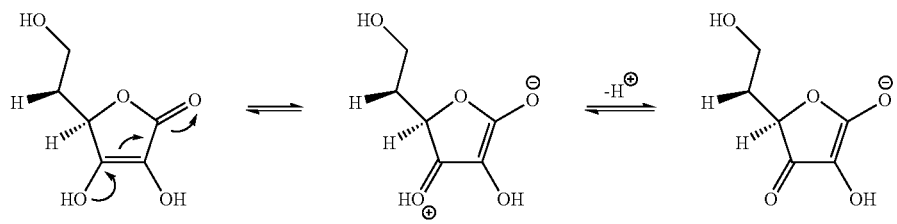

mixtures thereof or the like. The salts can be provided as hydrated salts or anhydrous salts. Exceptionally suitable zinc salts for the corrosion inhibitor composition include zinc chloride and zinc sulfate.

Sugar Acid Corrosion Inhibitor Compositions

According to an embodiment of the invention, a corrosion inhibitor composition is disclosed and comprises, consists of and/or consists essentially of a hypochlorite source and a corrosion inhibitor comprising both a sugar acid and a calcium compound. The corrosion inhibitor package of a sugar acid and calcium compound exhibits excellent corrosion inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the sugar acid and calcium compound generate synergistic increases in corrosion inhibition caused by hypochlorite sources, compared to corrosion inhibition obtained with the use of either a sugar acid or calcium compound alone.

The sugar acid and calcium compound according to the corrosion inhibitor compositions provide a source of calcium ions. Any water soluble calcium compound that provides calcium ions may be used according to the invention. The sources of calcium ions can be provided as elemental metals, organic salts, inorganic salts, organic oxides, inorganic oxides or mixtures thereof. The sources of calcium ions can further be provided as an anhydrous compound or as a hydrated component.

According to an embodiment of the invention, any sugar acid may be utilized and/or any oxidation product of a sugar acid. Sugar acids include monosaccharides with an —OH group oxidized to a carboxyl group. Exemplary sugar acids include aldonic acids, ulosonic acids, uronic acids and aldaric acids. As one skilled in the art will ascertain, aldonic acids are those sugar acids where the aldehyde functional group of an aldose is oxidized. Ulosonic acids are those sugar acids in which a keto-acid is formed via oxidation of the first hydroxyl According to an embodiment of the invention, the sugar acid and calcium corrosion inhibitor package is preferably comprised of a sugar acid selected from the group consisting of ascorbic acid, gluconic acid, galaturonic acid, mucic acid, and glucaric acid and a water soluble calcium salt. The sugar acid and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and sugar acid remain soluble in solution. In a further embodiment, the water soluble calcium and sugar acid remain dispersed in solution.

According to an embodiment of the invention, the calcium salt of the corrosion inhibitor composition has a chloride or non-halide anion. According to a preferred embodiment, the calcium salt does not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. According to a further embodiment of the invention, the zinc and calcium salts of the corrosion inhibiter are free of aluminum and magnesium ions.

Calcium Component of Corrosion Inhibitor Packages

According to any of the corrosion inhibitor compositions disclosed herein, suitable water soluble calcium salts according to the invention are not effective as oxidizing agents or reducing agents. In addition, suitable water soluble calcium salts do not contain an anion that acts as a bleach catalyst. Still further, oxidizing halogens and/or their hypohalous acids are not desirable for use according to the invention. Calcium salts may include, for example, calcium acetate, calcium benzoate, calcium chlorate, calcium chloride, calcium dihydrogen phosphate, calcium formate, calcium gluconate, calcium glycerophosphate, calcium lactate, calcium metasilicate, calcium nitrate, calcium pantothenate, calcium phosphate, calcium salicylate, calcium succinate, calcium sulfate, a hydrate thereof, and a mixtures thereof or the like. The salts can be provided as hydrated salts or anhydrous salts. Exceptionally suitable calcium salts for the corrosion inhibitor composition include calcium chloride and calcium sulfate.

According to an embodiment of the invention the corrosion inhibitor compositions comprise low levels of corrosion-inhibiting additives. According to a preferred embodiment the corrosion inhibitor compositions comprise ingredients on the U.S. Environmental Protection Agency (EPA) Inert Ingredient List for antimicrobial formulations.

According to the invention, a variety of hypochlorite sources may be utilized. The corrosion inhibitor is preferably a bleach hypochlorite solution. The hypochlorite source according to the invention includes sodium hypochlorite and sodium chloride. The hypochlorite source may further optionally include sodium hydroxide. A commercially-available hypochlorite source is XY-12, available from Ecolab, Inc. and provides a concentrated bleach hypochlorite suitable for use according to the invention. Preferably the hypochlorite solution is free of carbonate or bicarbonate anions.

The corrosion inhibitor compositions according to the invention have a suitable ratio of a hypochlorite source to corrosion inhibitor from about 10:1 to about 600:1. According to the invention, the level of corrosion inhibitor in a hypochlorite solution varies with the particular ratio of the corrosion inhibitor agent to calcium utilized for the corrosion inhibitor package. Particularly suitable ratios of hypochlorite source to corrosion inhibitor are from about 50:1 to about 200:1, from about 40:1 to about 150:1, from about 30:1 to about 100:1, from about 20:1 to about 50:1, and from about 10:1 to about 1:1.

The corrosion inhibitor composition can include a corrosion inhibitor package, comprising a corrosion inhibitor agent and calcium compound, in an amount from about 0.01 wt-% to about 50 wt-%, preferably about 0.01 wt-% to about 20 wt-%, more preferably from about 0.1 wt-% to about 10 wt-% and most preferably from about 0.1 wt-% to about 2 wt-%. The corrosion inhibitor composition includes an effective amount of the corrosion inhibitor package comprising the corrosion inhibitor agent and calcium compounds in order to provide a use solution inhibiting corrosion of metal surfaces contacted with hypochlorite sources. The phrase "effective amount" in reference to the corrosion inhibitors refers to an amount sufficient to provide a use corrosion inhibitor composition that inhibits surface corrosion compared with a composition that is identical except that it does not contain a sufficient amount of the corrosion inhibitor to reduce surface corrosion after contact with a hypochlorite source. According to a preferred embodiment, the sufficient amount of corrosion inhibitor does not adversely impact the stability of the hypochlorite source.

The corrosion inhibitor composition according to the invention further has a suitable ratio of corrosion inhibitor agent to calcium compound. According to an embodiment of the invention, a suitable ratio of a corrosion inhibitor agent to a calcium salt for the corrosion inhibitor package is from about 6:1 to about 1:6. Particularly suitable ratios of said corrosion inhibitor agent to the calcium salt are from about 4:1 to about 1:4.

The ratio of the corrosion inhibitor agent to calcium salt for the corrosion inhibitor package may be controlled to provide reduced corrosion of treated metal surfaces compared with the use of either component alone. According to the invention, the combined use of a corrosion inhibitor agent and calcium compound, namely water soluble calcium and corrosion inhibitor agent, can provide a synergy in the reduction of metal corrosion caused by a hypochlorite source.

The corrosion inhibitor composition generally includes a use solution that has a non-acidic pH. The pH suitable for use with the corrosion inhibitor composition may be either neutral or alkaline. As used herein, basic or alkaline pH refers to pH greater than 7, greater than or equal to 8, about 8 to about 9.5, about 8 to about 11, greater than about 9, or about 9 to about 10.5. According to the invention, a preferred use solution pH to provide a corrosion-inhibited hypochlorite bleach source is from about pH 7 to about pH 9, more preferably from about pH 7 to about pH 8.

Use Compositions

The present corrosion inhibitor composition or a composition containing the corrosion inhibitors can be provided in the form of a concentrate or a use solution. In general, a concentrate refers to a composition that is intended to be diluted with water to provide a use solution that contacts an object to provide the desired corrosion inhibition according to the invention. A use solution may be prepared from the concentrate by diluting the concentrate with water at a dilution ratio that provides a use solution having desired corrosion inhibition properties. In general, the corrosion inhibitor composition that contacts the articles to be protected from hypochlorite corrosion can be referred to as a use composition.

In an exemplary embodiment, a concentrate composition may be diluted at a weight ratio of diluent to concentrate of at least about 1:1 or about 1:1 to about 2000:1.

The use solution of a corrosion inhibitor composition will include at least about 25 parts per million (ppm) of the corrosion inhibitor to provide desired corrosion inhibition properties. Larger amounts of corrosion inhibitor can be used in the use solution without deleterious effects. Embodiments of the use solution of a corrosion inhibitor composition according to the invention can include from about 25 ppm to about 3000 ppm of the corrosion inhibitor, or about 50 ppm to about 2000 ppm of the corrosion inhibitor. The amount of corrosion inhibitor is calculated based upon the combined amount of sugar acid and calcium compound used according to the invention.

The concentrate may be diluted with water at the location of use to provide the use solution. When the corrosion inhibitor composition is used in an automatic warewashing or other machine, it is expected that the location of use will be inside the automatic machine. For example, when the corrosion inhibitor composition is used in a warewashing machine, depending on the machine, the hypochlorite source (i.e. bleach or sanitizer) may be provided in a unit dose form or in a multi-use form. In larger warewashing machines, a large quantity of corrosion inhibitor composition may be provided in a compartment that allows for the release of a single dose amount of the composition for each cycle. Such a compartment may be provided as part of the warewashing machine or as a separate structure connected to the warewashing machine.

Additional Agents for Corrosion Inhibitor Compositions

Corrosion inhibitor compositions made according to the invention may further include additional functional agents or additives that provide a beneficial property to the electrochemically-generated corrosion-inhibited hypochlorite solution. For example, additional agents or additives may be selected from the group consisting of pH adjusters or other neutralizing agents, surfactants, emulsifiers, sequestrants, solubilizers, other lubricants, solvents, buffers, detergents, cleaning agent, rinse aid composition, secondary anti-corrosion agent, preservatives, binders, thickeners or other viscosity modifiers, processing aids, carriers, water-conditioning agents, foam inhibitors or foam generators, threshold agent or system, scale inhibitors, aesthetic enhancing agent (i.e., dye, odorant, perfume), other agents or additives suitable for formulation with a corrosion inhibitor composition and the like, and mixtures thereof. Additional agents or additives will vary according to the particular corrosion inhibitor composition being manufactured and its intended use as one skilled in the art will appreciate based on the enabling disclosure of the present invention.

According to an additional embodiment of the invention, the corrosion inhibitor compositions do not contain any of the additional agents. Alternatively, a corrosion inhibitor composition according to the invention only contains hypochlorite-compatible additional agents, for example, surfactants, viscosity modifiers and fragrances. Preferably, the corrosion inhibitor composition does not contain the additional agents commercially-available in common detergent compositions.

Threshold Agents

According to one embodiment, the corrosion-inhibited hypochlorite cleaning solutions may also include threshold agents (i.e. scale inhibitors). Beneficially, the threshold agents obviate the need for softening water prior to use in electrochemical cells. As a result, the methods of electrolysis according to the invention are compatible with numerous water sources, including hard water, without experiencing the detrimental effects of hard water scaling in the cells. The inclusion of a threshold agent in an electrochemical cell further obviates the need for harsh acid-washing to maintain cell viability due to the prevention of hard water scaling in the cells. Various threshold agents suitable for use according to the invention are disclosed in U.S. patent application Ser. No. 12/986,312 (Ecolab 2697USU1), which is incorporated herein by reference in its entirety.

Exemplary suitable threshold agents are water soluble polymeric systems capable of preventing hard water scale formation, including for example on both electrodes and resin or ceramic membranes. The threshold agents are compatible for inhibiting scaling caused by hard water deposits, particularly in systems supplied with water having high levels of carbonate, hydroxide and/or phosphate ions along with water hardness ions traditionally leading to buildup in cells causing the unsightly residue, film and scaling that is detrimental to cells. According to an embodiment of the invention, water impurities such as calcium and magnesium are not deleterious to the electrolytic water once threshold agents are utilized to prevent crystallization and scaling with bicarbonate, carbonate, hydroxide, sulfate and/or phosphate ions. Accordingly, use of the threshold agent of the present invention obviates the need to "soften" the water source used in an electrochemical cell.

In an aspect, the threshold agents are substantially stable in the presence of chlorine or are substantially chemically-resistant to chlorine and the corrosive conditions of the electrochemical cell. In another aspect, the threshold agents do not increase the viscosity of the aqueous electrolytic solution, nor do they result in any decrease of hypochlorite production or other chlorine-containing oxidant production and does not deactivate the oxidizing effects of hypochlorite or other chlorine-containing oxidant if the threshold agent is added directly to a source.

According to a preferred embodiment, the threshold inhibiting agents may be a polycarboxylate or related copolymer. Polycarboxylates refer to compounds having a plurality of carboxylate groups. A variety of such polycarboxylate polymers and copolymers are known and described in patent and other literature, and are available commercially. Exemplary polycarboxylates that may be utilized as threshold inhibiting agents according to the invention include for example: homopolymers and copolymers of polyacrylates; polyacrylates; polymethacrylates; noncarboxylated materials such as polyolefinic and polymaleic copolymers, such as olefinic and maleic hydride copolymers; and derivatives and salts of all of the same.

Suitable polycarboxylates and related copolymers according to the invention may include water soluble polycarboxylate polymers, including for example homopolymeric and copolymeric agents. Additional suitable polycarboxylates may include homopolymeric and copolymeric agents, such as polymeric compositions with pendant ($-CO_2$ H) carboxylic acid groups, including polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, or mixtures thereof. According to a further embodiment, the water soluble salts or partial salts of these polymers and copolymers may further be suitable threshold agents according to the invention. Additional description of exemplary polycarboxylates is provided in U.S. Pat. No. 7,537,705.

Examples of oligomeric or polymeric polycarboxylates suitable as threshold agents include for example: oligomaleic acids as described, for example, in EP-A-451 508 and EP-A-396 303; co- and terpolymers of unsaturated C4-C8-dicarboxylic acids, possible co-monomers which may be present being monoethylenically unsaturated monomers from group (i) in amounts of up to 95% by weight, from group (ii) in amounts of up to 60% by weight, from group (iii) in amounts of up to 20% by weight. Examples of suitable unsaturated C4-C8-dicarboxylic acids include maleic acid, fumaric acid, itaconic acid and citraconic acid. Suitable co- and terpolymers are disclosed, for example, in U.S. Pat. No. 3,887,806.

The group (i) includes monoethylenically unsaturated C3-C8-monocarboxylic acids, such as acrylic acid, methacrylic acid, crotonic acid and vinylacetic acid, for example acrylic acid and methacrylic acid. Group (ii) includes monoethylenically unsaturated C2-C22-olefins, vinyl alkyl ethers with C1-C8-alkyl groups, styrene, vinyl esters of C1-C8-carboxylic acids, (meth)acrylamide and vinylpyrrolidone, for example C2-C6-olefins, vinyl alkyl ethers with C1-C4-alkyl groups, vinyl acetate and vinyl propionate. Group (iii) includes (meth)acrylic esters of C1-C8-alcohols, (meth)acrylnitrile, (meth)acrylamides of C1-C8-amines, N-vinylformamide and vinylimidazole.

Suitable polyacrylates, homopolymers and copolymers of polyacrylates, polyolefinic and polymaleic systems for threshold agents according to the invention may include organic compounds, including both polymeric and small molecule agents, including for example polyanionic compositions, such as polyacrylic acid compounds. Polymeric agents commonly comprise polyanionic compositions such as polyacrylic acid compounds. Polymers such as Acusol 448 (Rohm & Haas) and others are commercially available and may be useful according to the present invention. For example, exemplary commercially available acrylic-type polymers include acrylic acid polymers, methacrylic acid polymers, acrylic acid-methacrylic acid copolymers, and water-soluble salts of the said polymers. These include polyelectrolytes such as water soluble acrylic polymers such as polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, hydrolyzed methacrylamide, hydrolyzed acrylamide-methacrylamide copolymers, and combinations thereof. Such polymers, or mixtures thereof, include water soluble salts or partial salts of these polymers such as their respective alkali metal (for example, sodium or potassium) or ammonium salts can also be used. The weight average molecular weight of the polymers is from about 2,000 to about 20,000. According to a preferred embodiment, the threshold agent for use in the compositions and methods of the present invention is the commercially-available Acumer 1000.

According to an additional embodiment of the invention, sulfonated polymers may be used as the threshold agent for inhibiting scaling in an electrochemical cell. These may include a variety of sulfonated polymers and copolymers, such as for example, carboxylic sulfonated polymers and copolymers, carboxylic sulfonated nonionic terpolymers, sulfonated styrene/maleic acid copolymers and various other sulfonated polymers and copolymers as may be ascertained by those of ordinary skill in the art to which the invention pertains.

Examples of suitable commercially available threshold agents include, for example: Acusol 588 and Acusol 420 (all available from Rohm & Haas). Preferably, the threshold agent is a polycarboxylate selected from the group consisting of homopolymers and copolymers of polyacrylates, polyolefinic systems, polymaleic systems, derivatives and salts of the same, and combinations of the same. More preferably, the threshold agent is the polycarboxylate is Acumer 1000. Although not intending to be limited according to a particular theory, the threshold agents suitable for use according to the present invention are preferably short chain polymers with low molecular weights that do not cause decreased chlorine production or increased voltage demand as a result of a large molecular weight and long chain interfering with electrical flow in an electrochemical cell. According to an embodiment of the invention, suitable threshold agents have a molecular weight less than at least 5,000, more preferably less than 4,000, more preferably less than 3,000 and according to a most preferred embodiment less than 2,000. According to one aspect of the invention, a composition may include about 50 ppm to about 10,000 ppm of a threshold agent.

Methods of Generating Corrosion-Inhibited Hypochlorite

The methods and compositions according to the invention maybe utilized with various types, sizes and designs of electrolysis cells. Exemplary electrochemical cells include, but are not limited to those described in for example U.S. Pat. Nos. 6,773,575, 6,767,447, 6,761,815 and 6,712,949.

Additionally, the methods and compositions according to the invention may be further utilized with various types of electrodes known by those of ordinary skill in the art to electrolyze water. For example, any variety of electrodes, including corrosion-resistant electrodes, may be utilized according to the methods and compositions of the invention. The electrode materials useful according to the invention are electrical conductors that are stable in the media to which they are exposed. These may include for example, titanium alloy, aluminum, niobium, chromium, manganese, molybdenum, ruthenium, tin, tantalum, vanadium, zirconium, nickel, cobalt, iron, copper, iridium and combinations of the same known to one of ordinary skill in the art.

Additionally, one skilled in the art may ascertain the voltage required by the electrolytic cell according to the invention, based upon factors such as anolyte and catholyte solutions, membrane thickness and conductivity and other factors such as hypochlorite production. Determination of these and other optimum parameters for a particular electrochemical system can be readily ascertained by those skilled in the art.

The methods and compositions according to the invention may be adapted for use according to the type and structure of the electrochemical cell, such that the corrosion-inhibited hypochlorite generated can be produced by any type of electrochemical cell. For purposes of convenience, the disclosure is primarily directed to chlor-alkali electrolytic cells and cells using no ion exchange membranes, cation exchange membranes, and anion exchange membranes; but as one skilled in the art can appreciate, the methods and compositions according to the invention are also applicable to other electrolytic cells used for conducting an electrochemical process.

As set forth, in a non-limiting embodiment of the invention, the electrochemical process is used for the electrolysis of inorganic materials, such as the aqueous inorganic metal salt solution of sodium chloride brine. According to this embodiment, the corrosion inhibitor agent is added directly to the brine source of an electrochemical cell. However, according to the invention the structure of the cell may vary, for example the cell may produce a single hypochlorite product stream from a one compartment cell. Alternatively, cells may be utilized to produce more than one effluent product, such as for example, hypochlorite, sodium hydroxide, hydrogen peroxide, etc. According to these embodiments there are more than one compartments, separated by a membrane which results in the production of distinct effluent streams from a cell. However, according to the invention, regardless of the cell structure the corrosion inhibitor agent beneficially inhibits corrosion of the cell structure and provides the same benefits in the effluent of the cell which is used for a variety of cleaning applications.

According to one embodiment, the corrosion inhibitor is added to the feed water provided to an electrochemical cell. According to another embodiment, the corrosion inhibitor agent is added to the cathodic chamber of an electrochemical cell having two or more chambers. In a further embodiment, the corrosion inhibitor agent is added to the central chamber of a three compartment cell. In a still further embodiment, the corrosion inhibitor agent is added to the anodic chamber and crosses over a membrane into the cathodic chamber. Alternatively, the corrosion inhibitor agent may be added directly to an effluent from an electrochemical cell to produce a corrosion-inhibited hypochlorite cleaning solution.

According to an embodiment of the invention, a method of making a hypochlorite cleaning solution includes obtaining an electrochemical cell configured with at least one anode and cathode to produce hypochlorite, providing a water and a sodium chloride source to the electrochemical cell and applying an electric current to the electrochemical cell to produce hypochlorite. According to an embodiment, the corrosion inhibitor agent described according to the invention may be added directly to the electrochemical cell. In additional embodiments, additional functional ingredients may be added to the cell as well, including for example, a threshold agent.

The methods and compositions according to the invention may be further utilized with various types of feed water. According to an embodiment, any feed water may be utilized. According to a further embodiment, aqueous sodium chloride feed may be pure or impure, for example salt water or brine. Preferably, the concentration of sodium chloride in the aqueous solution is at or below the saturation limit in water.

The methods and compositions according to the invention may be further utilized with various types of sodium chloride feed. In an aspect, the sodium chloride is provided to a cell in solid form, such as salt pellets. In another aspect, the sodium chloride is provided to a cell in an aqueous sodium chloride form. In an aspect of the invention, the corrosion inhibitor may be formulated into an all-in-one formulation and packaged into a solid with the sodium chloride. In such an embodiment, various solid forms, such as pellets may be employed to conveniently dose both the sodium chloride feed and the corrosion inhibitor to the electrochemical cell.

According to the invention, the corrosion inhibitor agents and methods of using the same with electrochemical cells provide beneficial improvements in cell longevity.

Additionally, the corrosion inhibitor agents and methods of using the same according to the invention do not interfere with or disrupt the production of chlorine or hypochlorite in an electrochemical cell. The corrosion inhibitor agents according to the invention do not cause any detrimental effects on the rate of chlorine/hypochlorite production or the concentration of chlorine/hypochlorite produced in a cell. According to a further embodiment, the use of the corrosion inhibitor agents do not decrease the efficacy of the sanitizing hypochlorite effluent from the electrochemical cell, based upon EPA standards for sanitization. According to a preferred embodiment, the use of the corrosion inhibitor agents improve the efficacy of the hypochlorite as an antimicrobial agent that produced by an electrochemical cell.

According to the invention, the combined use of a corrosion inhibitor and threshold agent unexpectedly results in a hypochlorite product having improved cleaning capabilities. Although not intending to be limited according to a particular theory, according to certain embodiments of adding the threshold agent to a brine source for hypochlorite production, an enhanced cleaning result is obtained. The presence of the threshold agent results in a cleaning, sanitizing and bleaching product that provides a cleaner result, without visible streaking or spotting. For example, use of the threshold agent-treated hypochlorite on clear surfaces such as glass or mirrors provides the unexpected result of a dried surface without streaking or spotting since the threshold agent inhibited the crystallization of salts in the hypochlorite. This is extremely beneficial for one compartment electrochemical cells producing hypochlorite or other cleaning materials where the caustic is not separated from the hypochlorite and unconverted chloride salt. According to this embodiment, the hypochlorite or other cleaning material has a high total dissolved solids remaining in the water interfering with a cleaned surface. In another embodiment, the hypochlorite product has a low total solids and the threshold agent provides reduced streaking and spotting on a treated surface due to the water hardness ions used to generate the hypochlorite.

The corrosion-inhibited hypochlorite source generated by the electrolytic cell according to the invention beneficially has a non-acidic pH. The pH suitable for use with the corrosion inhibitor composition may be either neutral or alkaline. As used herein, basic or alkaline pH refers to pH greater than 7, greater than or equal to 8, about 8 to about 9.5, about 8 to about 11, greater than about 9, or about 9 to about 10.5.

According to the invention, a preferred use solution pH to provide a corrosion-inhibited hypochlorite bleach source is from about pH 7 to about pH 9, more preferably from about pH 7 to about pH 8.

Dispensing of the Corrosion Inhibitor Compositions

The corrosion inhibitor compositions generated from an electrochemical cell according to the present invention can be dispensed in any suitable method generally known by one skilled in the art. For example, spray-type dispenser such as that disclosed in U.S. Pat. Nos. 4,826,661, 4,690,305, 4,687,121, 4,426,362 and in U.S. Pat. Reissue Nos. Re 32,763 and 32,818, the disclosures of which are incorporated by reference herein. A spray-type dispenser functions by impinging a water spray upon an exposed surface of the solid composition to dissolve a portion of the composition, and then immediately directing the concentrate solution including the composition out of the dispenser to a storage reservoir or directly to a point of use.

In an embodiment, the present corrosion inhibitor composition can be dispensed by immersing either intermittently or continuously in water. The composition can then dissolve, for example, at a controlled or predetermined rate. The rate can be effective to maintain a concentration of dissolved cleaning agent that is effective for use according to the methods of the claimed invention.

In an embodiment, the present corrosion inhibitor composition can be dispensed by scraping solid from the solid composition and contacting the scrapings with water. The scrapings can be added to water to provide a concentration of dissolved corrosion inhibitor that is effective for use according to the methods of the claimed invention.

Methods of Use for Corrosion-Inhibited Hypochlorite Cleaning Solutions

The methods for corrosion inhibition according to the invention protect surfaces in contact with hypochlorite sources from corrosion caused by hypochlorite bleach used for a variety of surfaces and antimicrobial treatments. Methods for corrosion inhibition according to the invention may comprise, consist of and/or consist essentially of contacting a surface with a corrosion inhibitor composition, wherein said corrosion inhibitor composition comprises a hypochlorite source and a sugar acid and calcium compound. The corrosion inhibitor compositions provide an inhibited hypochlorite solution that can be used as a bleach or surface antimicrobial agent in a variety of applications. One skilled in the art will appreciate and know various application methods.

In an embodiment, the methods of the invention relate to a method employing the corrosion inhibitor composition. The method can include providing the corrosion inhibitor composition to a surface treated with a hypochlorite solution in order to inhibit corrosion caused by the hypochlorite solution. The method can include preparing an aqueous use composition of the present corrosion inhibitor composition. The method may further include contacting a surface, such as a hard metal surface, in need of corrosion inhibition due to contact with a hypochlorite solution.

A variety of suitable surfaces may be contacted with the corrosion inhibitor composition according to the invention. Particularly suitable surfaces for treatment with the corrosion inhibitor compositions according to the invention include metallic and metal-containing surfaces, including steel, rolled steel and stainless steel.

Surfaces may be contacted according to the methods of the present invention for use as a hard surface cleaner or sanitizer, including for example, industrial surfaces, agricultural surfaces, food and beverage surfaces, food service and restaurant surfaces, ware, vehicle surfaces, and health care surfaces.

According to an embodiment of the invention, it is desirable to use the corrosion inhibitor compositions and the claimed methods of use to inhibit the corrosion of metal surfaces contacted with hypochlorite used as a hard surface sanitizer in janitorial and/or housekeeping applications and food processing equipment and/or plant applications and in laundry applications. For example, the corrosion of washers, such as tunnel washers for washing textiles, may be inhibited according to methods of the claimed invention.

Surfaces particularly well suited for use of the compositions and methods of the invention include those in need of disinfectant treatment, such as hospital and other medical facility markets. Exemplary surfaces commonly found in such settings include, for example, 6061 aluminum, 304 stainless steel, polished nickel and plated chrome. As sodium hypochlorite has been shown to be beneficial to disinfecting *Clostridium difficile* as well as other organisms it is recommended for use in contaminated areas. (See Guide to the Elimination of *Clostridium Difficile* in Healthcare Settings, 2008, Association for Professionals in Infection Control Epidemiology, Inc.; Guidelines for Environmental Infection Control in Health-Care Facilities, 2003, Centers for Disease Control and the Healthcare Infection Control Practices Advisory Committee). In particular, health care surfaces are well suited as they often contain metal surfaces that can be easily damaged by contact with sodium hypochlorite. An exemplary surface is a medical instrument with metals in the construction. The present invention of a corrosion inhibitor composition allows for the use of sodium hypochlorite on such hospital and other surfaces where it cannot otherwise be utilized. The methods of applying the corrosion inhibitor composition may include, for example, the use of a spray or a wipe method (e.g. use of a pre-saturated wipe configuration). A wipe method is particularly desirable as a result of concerns of respirator difficulties for those using the compositions containing sodium hypochlorite.

In addition, surfaces may be contacted according to the methods of the present invention for use in low temperature dish and/or warewash sanitizing final rinse, toilet bowl cleaners, and laundry bleaches. According to further embodiments, the corrosion inhibitor compositions and the claimed methods are used as sanitizers for pools, spas, and hot tubs. According to further embodiments of the invention, the methods are used to treat metal surfaces, such as ware, cleaned and/or sanitized with corrosive hypochlorite sources.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

A corrosion test applied hypochlorite solutions to 304 stainless steel coupons for three days at 120° F. The commercially-available concentrated hypochlorite bleach product XY-12 (Ecolab, Inc.), containing 12% sodium hypochlorite and a use solution of the bleach product diluted to 100 ppm hypochlorite were applied to the stainless steel coupons. Both hypochlorite solutions caused heavily discolored (dark brown) coupons. In addition, the stainless steel coupons treated with the concentrated bleach/hypochlorite solution showed further corrosion signs of pitting and rust.

Example 2

Comparison of corrosive effects of hypochlorite solutions with corrosion inhibitor compositions. The weight loss of the coupons was determined, with higher weight loss corresponding to loss of metal due to corrosion. The commercially-available concentrated bleach product was modified to contain a non-thickening polyacrylate. The commercially-available polyacrylate Acusol 445N (available from Rohm and Haas) was tested for anti-corrosion efficacy alone, in combination with calcium chloride and compared to calcium chloride alone. Formulations for the various tests are shown in Table 1 below.

TABLE 1

Corrosion Inhibition Test System

| Component 1 | ppm | Component 2 | ppm | % Wt Loss |
| --- | --- | --- | --- | --- |
| Acusol 445N | 1 | — | — | 0.099 |
| Acusol 445N | 5 | — | — | 0.093 |
| Acusol 445N | 50 | — | — | 0.065 |
| Acusol 445N | 200 | — | — | 0.081 |
| Acusol 445N | 1 | Ca chloride | 50 | 0.055 |
| Acusol 445N | 5 | Ca chloride | 50 | 0.035 |
| Acusol 445N | 50 | Ca chloride | 50 | 0.056 |
| Acusol 445N | 200 | Ca chloride | 50 | 0.043 |
| Ca chloride | 1 | — | — | 0.078 |
| Ca chloride | 5 | — | — | 0.073 |
| Ca chloride | 50 | — | — | 0.073 |
| Ca chloride | 200 | — | — | 0.074 |

The commercially available hypochlorite solution of Example 1 was diluted to 100 ppm hypochlorite and further modified according to the corrosion inhibition test systems described in Table 1. Non-significant, very slight discoloration of the stainless steel coupon at the air/liquid interact was obtained after three days at 120° F. No pitting and/or rusting corrosion was obtained.

The combination of polyacrylate and calcium chloride showed synergistic reduction in the attack of hypochlorite on stainless steel surfaces. Synergy was determined from the data obtained from designed experiments and an analysis specifically focused on finding synergy. The synergy and rations of ingredients of a corrosion inhibitor package that achieve such synergy are described further herein below. The results were unexpected as a result of the use of the polyacrylate with the hypochlorite solution showing an accelerated attack of hypochlorite on the steel surfaces. In addition, the calcium by itself did not show any efficacy for corrosion inhibition of hypochlorite solutions.

The corrosion inhibition packages according to the invention provide simultaneous control of all corrosive mechanisms of sodium hypochlorite, sodium chloride, and sodium hydroxide (or any combination of the same that may be found in a bleach or hypochlorite source). The corrosion inhibition does not result in any inhibition, inactivation or other modification to the stability of the hypochlorite source, as may be readily measured by one skilled in the art to which the invention pertains.

Example 3

Comparison of corrosive effects of hypochlorite solutions with corrosion inhibitor compositions. The weight loss of the coupons was determined, with higher weight loss corresponding to loss of metal due to corrosion. The commercially-available concentrated bleach product was modified to contain ascorbic acid. The ascorbic acid was tested for anti-corrosion efficacy alone, in combination with calcium chloride and compared to calcium chloride alone. Formulations for the various tests are shown in Table 2 below.

TABLE 2

Corrosion Inhibition Test System

| Component 1 | ppm | Component 2 | ppm | % Wt Loss |
|---|---|---|---|---|
| Ascorbic acid | 1 | — | — | 0.075 |
| Ascorbic acid | 5 | — | — | 0.075 |
| Ascorbic acid | 50 | — | — | 0.081 |
| Ascorbic acid | 200 | — | — | 0.071 |
| Ascorbic acid | 1 | Ca chloride | 50 | 0.061 |
| Ascorbic acid | 5 | Ca chloride | 50 | 0.050 |
| Ascorbic acid | 50 | Ca chloride | 50 | 0.044 |
| Ascorbic acid | 200 | Ca chloride | 50 | 0.046 |
| Ca chloride | 1 | — | — | 0.078 |
| Ca chloride | 5 | — | — | 0.073 |
| Ca chloride | 50 | — | — | 0.073 |
| Ca chloride | 200 | — | — | 0.074 |
| — | — | — | — | 0.070 |

The commercially available hypochlorite solution of Example 1 was diluted to 100 ppm hypochlorite and further modified according to the corrosion inhibition test systems described in Table 1. Non-significant, very slight discoloration of the stainless steel coupon at the air/liquid interact was obtained after three days at 120° F. No pitting and/or rusting corrosion was obtained.

The combination of sugar acid (ascorbic acid) and calcium chloride showed synergistic reduction in the attack of hypochlorite on stainless steel surfaces. Synergy was determined from the data obtained from designed experiments and an analysis specifically focused on finding synergy. The synergy and rations of ingredients of a corrosion inhibitor package that achieve such synergy are described further herein below. The results were unexpected as a result of the use of the ascorbic acid with the hypochlorite solution showed some accelerated attack of hypochlorite on the steel surfaces. In addition, the calcium by itself did not show any efficacy for corrosion inhibition of hypochlorite solutions.

The corrosion inhibition packages according to the invention provide simultaneous control of all corrosive mechanisms of sodium hypochlorite, sodium chloride, and sodium hydroxide (or any combination of the same that may be found in a bleach or hypochlorite source). The corrosion inhibition does not result in any inhibition, inactivation or other modification to the stability of the hypochlorite source, as may be readily measured by one skilled in the art to which the invention pertains.

Example 4

Comparison of corrosive effects of hypochlorite solutions with corrosion inhibitor compositions. The commercially-available concentrated bleach product was diluted to 100 ppm hypochlorite and further modified to contain 1000 ppm of 4:1 parts by weight of zinc chloride to calcium chloride. Non-significant, very slight discoloration of the stainless steel coupon at the air/liquid interact was obtained after three days at 120° F. No pitting and/or rusting corrosion was obtained.

The commercially-available concentrated bleach product was further diluted to 100 ppm hypochlorite and modified to contain 1 ppm of 4:1 parts by weight of zinc chloride to calcium chloride. Again, no sign of discoloration, pitting and/or rusting corrosion was obtained.

Example 5

The effect of zinc to calcium ratio on corrosiveness of bleach concentrate was tested using the experimental conditions set forth in Example 1. The impact of the zinc to calcium ratio on effectiveness as a corrosion inhibitor was tested versus concentration of total corrosion inhibitor used. FIG. 1 shows the change in the weight of the aged stainless steel coupons and the total corrosion inhibitor concentration.

Superior protection from corrosion (as measured based on loss of metal) without the formation of undesirable scale falls closely to the line corresponding to 0% weight change. Effective corrosion inhibition protection for each ratio tested was observed down to about 200 ppm total inhibitor in the 12% hypochlorite solution concentrate regardless of zinc to calcium ratio, demonstrating efficacy at a ratio of total corrosion inhibitor to hypochlorite anion of about 1:600. At 1000 ppm, all ratios of zinc to calcium corrosion inhibitor protected the stainless steel coupons from corrosion by the hypochlorite solution. However, the greatest tendency for scaling was observed with the 1:1 zinc to calcium corrosion inhibitor and the 4:1 zinc to calcium corrosion inhibitor.

Example 6

The effect of pH on corrosion inhibition efficacy of zinc and calcium corrosion inhibitors was tested. Use solutions of concentrated bleach were diluted to 100 ppm hypochlorite was prepared. The pH of the use solutions was adjusted using HCl or NaOH. A corrosion test was then conducted according to the conditions set forth in Example 1.

Figure 2:
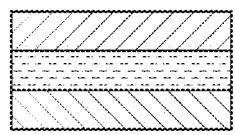
FIG. 2 shows data demonstrating the effect of pH on corrosion of stainless steel with ready-to-use corrosion inhibitor.

The graph in FIG. 2 illustrate that areas of effective corrosion inhibitor protection of the stainless steel coupons were achieved at both neutral and alkaline pH ranges regardless of the ratio of zinc to calcium.

Example 7

The synergy between zinc and calcium corrosion inhibitors was tested using the experimental conditions set forth in Example 1. The effect of the levels of zinc and calcium were evaluated and the synergy of the combination of the total corrosion inhibitor package against corrosion by a commercial bleach concentrate are demonstrated in Table 3.

In addition, the corrosion inhibition obtained from calcium salts alone, in the absence of zinc salts, was ineffective for hypochlorite solutions.

TABLE 3

Corrosion Inhibition Test System

| Component 1 | ppm | Component 2 | ppm | % Wt Loss |
|---|---|---|---|---|
| Zn chloride | 1 | — | — | 0.089 |
| Zn chloride | 5 | — | — | 0.077 |
| Zn chloride | 50 | — | — | 0.059 |
| Zn chloride | 200 | — | — | 0.027 |
| Zn chloride | 1 | Ca chloride | 50 | 0.061 |
| Zn chloride | 5 | Ca chloride | 50 | 0.055 |
| Zn chloride | 50 | Ca chloride | 50 | 0.019 |
| Zn chloride | 200 | Ca chloride | 50 | 0 |
| | 1 | Ca chloride | — | 0.078 |
| | 5 | Ca chloride | — | 0.073 |
| | 50 | Ca chloride | — | 0.073 |
| | 200 | Ca chloride | — | 0.074 |
| — | — | — | — | 0.070 |

Example 8

The use of sodium hypochlorite solutions as a disinfectant were analyzed in combination with the corrosion inhibitor compositions according to the invention demonstrating efficacy and applications for use in hospital settings and other medical facility markets. The damaging effects of un-inhibited sodium hypochlorite sources were evaluated for use in contaminated areas compared to compositions according to the invention. The damaging effects of sodium hypochlorite to metal surfaces were evaluated.

A corrosion inhibiting sodium hypochlorite formulas according to embodiments of the invention were utilized (compared to a control of sodium hypochlorite composition without the corrosion inhibiting portion of the compositions). Exemplary disinfectant compositions utilized are set forth in Table 4.

TABLE 4

Disinfectant Formula Ranges

| Sodium Hypochlorite ppm | Zn Salt:Ca Salt Ratio | Corrosion Inhibitor % |
|---|---|---|
| 500-30,000 ppm | 6:1 to 1:6 | 0.01-2.0% |
| 1500-15,000 ppm | 6:1 to 1:6 | 0.01-2.0% |
| 4,000-7,000 ppm | 4:1 to 1:4 | 0.02-0.03% |

Evaluated surfaces included the common hospital surfaces of 6061 aluminum, 304 stainless steel, polished nickel and plated chrome.

A pre-saturated wipe was evaluated for delivering the corrosion inhibitor compositions and control compositions. The pre-saturated wipe material was generated by soaking a wipe to generate approximately 400 times its weight to ensure proper wetness. One wipe from each tested variable was then used to wipe each coupon set (e.g. 6061 aluminum, 304 stainless steel, polished nickel and plated chrome). Metal coupons were swept horizontally with the wipe to apply the solution. The entire coupon was covered with the solution and allowed to visibly dry in between applications (approximately 4-5 minutes). The steps were repeated before rinsing the coupons with deionized water and allowed to dry.

The non-corrosion inhibited control formulas demonstrated signs of corrosion on the tested surfaces, whereas the corrosion inhibiting formulas according to embodiments of the invention achieved effective disinfecting of the surfaces without resulting corrosion.

Example 9

The use of Threshold Agent to prevent electrode scaling in hard water was evaluated. A clean 1"×6" pair of ruthenium (Ru) coated DSA electrodes for hypochlorite production was analyzed for hard water scaling. The pair of electrodes were placed in a stirred 4L solution of 1000 ppm of sodium chloride. The sodium chloride solution was made using 17 grain (gpg) hard water. The electrodes in the sodium chloride solution were energized with about 8-12 volts/0.5 amps from a DC power source. After 4 hours in the electrochemical cell of the sodium chloride solution, the electrodes were removed and air dried. The electrodes were visually examined, revealing a heavy white scale covering the inside of the cathode.

Example 10

The prevention of electrode scaling in hard water with threshold agent was further evaluated according to the methods of Example 9 using a variety of polyacrylate threshold agents and a known reverse EO-PO copolymer threshold agent. The threshold agents were added to the 17 grain hard water sodium chloride solution. First, using a clean 1"×6" pair of Ru-coated DSA electrodes for hypochlorite production. The electrodes were placed in a stirred 4L solution of 1000 ppm of sodium chloride and 100 ppm Acumer 1000 (an acrylic homopolymer of about 2000 molecular weight, available from Rohm & Haas as a 48% solids product). The electrodes in the sodium chloride solution were energized with about 8-12 volts/0.5 amps from a DC power source. After 4 hours, the electrodes were removed and air dried. No build-up of hard water scale was observed on the cathode submerged in the electrochemical cell containing the threshold agent.

The methods were repeated using solutions containing alternative threshold agents. Electrodes placed in a solution of 1000 ppm of sodium chloride and 100 ppm Acusol 448 (an acrylic acid/maleic acid copolymer of about 3200 molecular weight, available from Rohm & Haas) and treated using the same volts/amps from a DC power source resulted in a very slight build-up of hard water scale on the cathode. Electrodes placed in a solution of 1000 ppm of sodium chloride and 100 ppm Acusol 587 (an acrylic/sulfonic acid copolymer with a molecular weight of about 10,800, available from Rohm & Haas as a 37% solid product) and treated in an electrolyzed cell using the same volts/amps from a DC power source resulted in a very slight build-up of hard water scale on the cathode. Still further, electrodes placed in a solution of 1000 ppm of sodium chloride and 100 ppm Acusol 588 (an acrylic/sulfonic acid copolymer with a molecular weight of about 12,000, available from Rohm & Haas as a 37% solid product) according to the same methods and materials, resulted in a noticeable build-up of hard water scale on the cathode.

Electrodes placed in a solution of 1000 ppm of sodium chloride and 100 ppm Versa TL-4 (a sulfonated styrene/maleic acid copolymer with a molecular weight of about 20,000, commercially available from Alco as a 25% solids product) and treated in an electrolyzed cell using the same volts/amps from a DC power source resulted in a heavy build-up of hard water scale on the cathode. Electrodes tested in an electrolyzed cell containing a solution of 1000 ppm of sodium chloride and 100 ppm Acusol 460N (an olefin/maleic acid copolymer with a molecular weight of about 15,000, commercially available from Rohm & Haas as a 25% solid product) resulted in a noticeable build-up of water scale on the cathode. Additionally, electrodes tested in an electrolyzed cell containing a solution of 1000 ppm of sodium chloride and 100 ppm Pluronic N3 (a nonionic surfactant which is a reverse copolymer of ethylene oxide-propylene oxide available from BASF) also resulted in a noticeable build-up of water scale on the cathode.

Example 11

Figure 3:
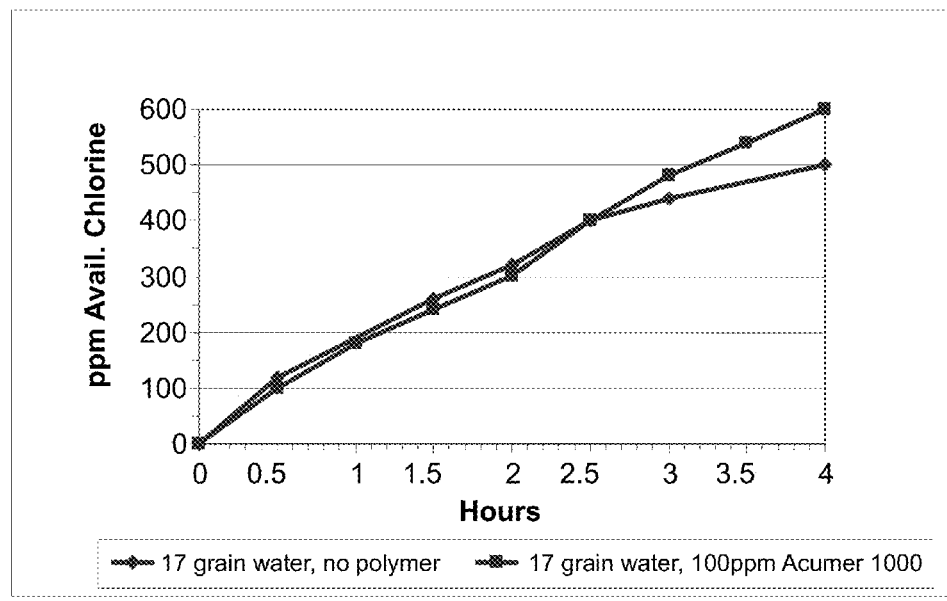
FIG. 3 shows the effect of the threshold agent Acumer 1000 on hypochlorite formation in an electrochemical cell.

The effect of threshold inhibitor on hypochlorite formation rate was evaluated. A stirred 4L solution of 1000 ppm of sodium chloride and 100 ppm Acumer 1000 (a polyacrylate of about 2000 molecular weight available from Akzo) was made using 17 grain hard water. A clean 1"×6" pair of Ru-coated DSA electrodes for hypochlorite production were placed in the solution. The electrodes were energized with about 8-12 volts/0.5 amps from a DC power source in the electrochemical cell. Samples were periodically removed from the solution and titrated for available chlorine. FIG. 3 shows a plot of the titration data versus time, demonstrating that the threshold agent Acumer 1000 did not result in any decrease in the rate of hypochlorite formation in the electrochemical cell. Therefore, the polyacrylate threshold agent is capable of preventing hard water scale formation on the cathodes of the electrolyzed cell without decreasing the product of hypochlorite.

Figure 4:
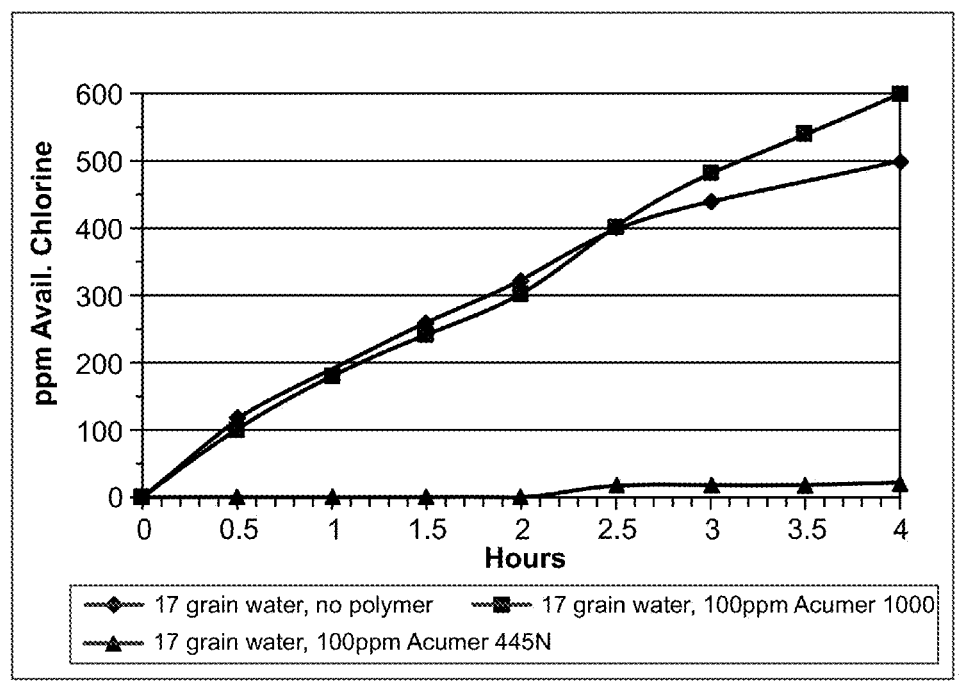
FIG. 4 shows the comparative effects of threshold agents Acumer 1000 and Acusol 445N on hypochlorite formation in an electrochemical cell.

The methods were repeated using the same threshold agent (Acumer 1000) and compared to Acusol 445N. FIG. 4 shows a plot of the titration data versus time, comparing the effect on hypochlorite formation in the electrochemical cell of the threshold agent Acumer 1000 versus Acusol 445N. Although Acusol 445N caused reduction in scaling in the cell, the polymer significantly decreased the production of hypochlorite.

Although not intending to be limited to a particular theory, according to the invention, the Acusol 445 polymer interferes with hypochlorite production as a result of the polymer being water soluble and situating itself between the site of formation of the hydroxide (primarily at the cathode surface between electrode plates). The Acusol 445 polymer binds too tightly to the Ru-electrode surface and interferes with the electrochemical cell and production of the hydroxide. The Acumer 1000 polymer threshold agent is also a water soluble agent that may bind to the electrode surface, however, the polymer does not bind as tightly to interfere with the cell. One skilled in art would be able to select other threshold agents according to the invention based upon the material and construction of electrodes and the binding mechanism identified by Applicants.

Example 12

The efficacy of corrosion inhibitor and hypochlorite solutions was evaluated to analyze corrosion inhibition of treated metal surfaces. In particular, the use of a corrosion-inhibited hypochlorite cleaning solution known to have efficacy against bacterial spores such as *C. difficile* were evaluated, as such hypochlorite solutions are well known to cause corrosion and discoloration on treated metal surfaces. The improved electrolyzed water products generated according to the methods of the invention were evaluated for reduced corrosion of the treated surfaces.

A soak test for evaluation of corrosion on metal was conducted according to the following methods. Samples of corrosion inhibited hypochlorite solutions were prepared. Prior to beginning the tests, the ppm concentrations and pH for each cleaning solution was confirmed. The equal amount of chemistry were placed in sealed jars to completely cover coupons of the applicable metal (i.e. treated surface). Both 304 and 316 stainless steel coupons were employed as exemplary hospital and industrial metal surfaces. Each coupon was weighed and labeled before being placed in the jar with the chemistry to be tested. The jars were placed into chambers at a temperature of 120° F. for 7 days. The coupons were rinsed, dried, weighed, and any visual changes were noted. After each analysis the ppm concentrations and pH of each cleaning solution was re-tested.

The chemistries evaluated are shown in Table 5.

TABLE 5

| Hypochlorite Chemistries | | |
|---|---|---|
| | Hypochlorite | Corrosion Inhibitor |
| XY-12 (Ecolab Inc.) | 6500 ppm | NA |
| XY-12 with Corrosion Inhibitor (Ecolab Inc.) | 6500 ppm | 4:1 ratio zinc chloride:calcium chloride |
| Clorox Bleach (The Clorox Company) | 5200 ppm | Ammonium Chloride compounds |
| Dispatch Bleach (Caltech Industries) | 6500 ppm | NA |

Figure 5:
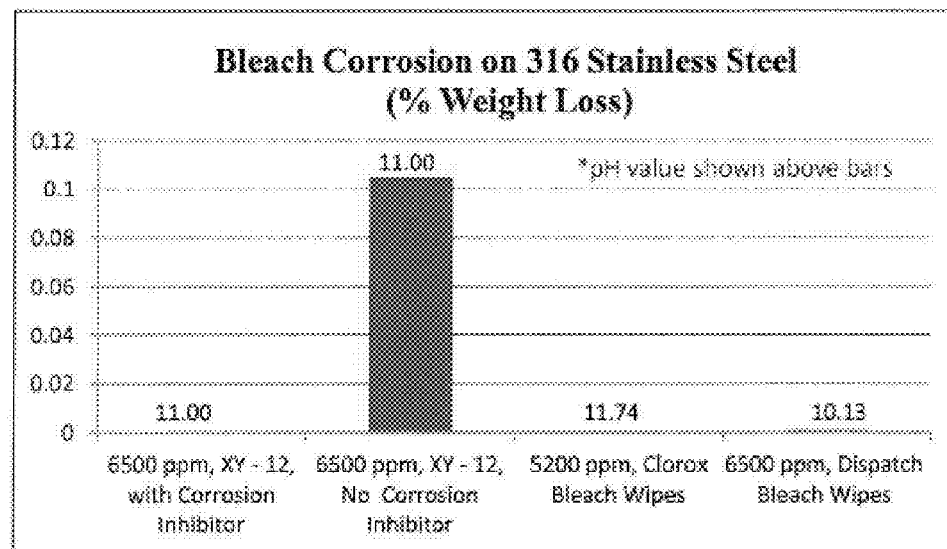
FIG. 5 shows the comparative effects of corrosion-inhibited hypochlorite solutions versus commercial products on bleach corrosion on 316 stainless steel surfaces according to an embodiment of the invention.
Figure 6:
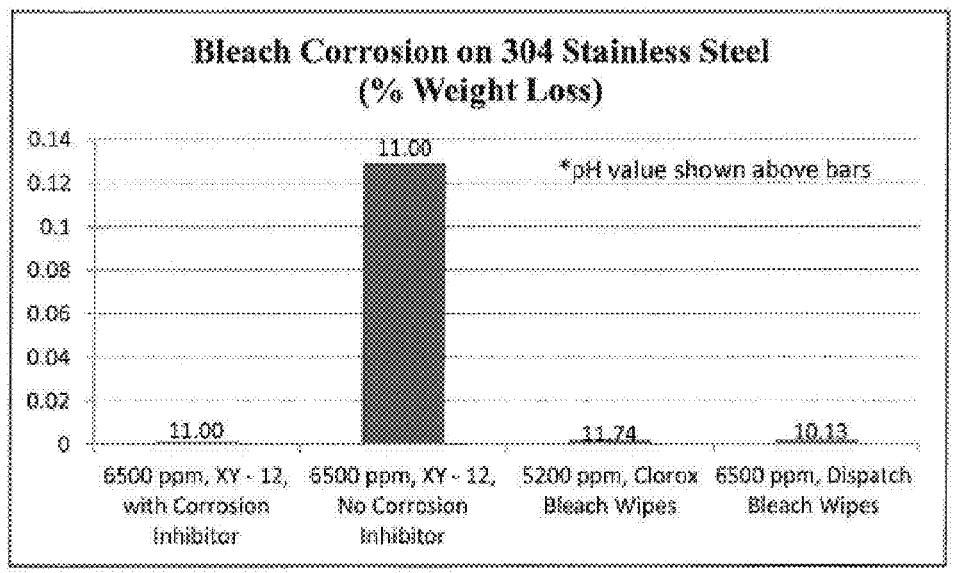
FIG. 6 shows the comparative effects of corrosion-inhibited hypochlorite solutions versus commercial products on bleach corrosion on 304 stainless steel surfaces according to an embodiment of the invention.

Soak Test Results Showing Corrosion Effects. As shown in both FIG. 5 and FIG. 6, regardless of the metal treated, in all cases, the corrosion-inhibited hypochlorite solutions of the present invention resulted in less weight loss of the metal when compared to un-inhibited hypochlorite solution (i.e. XY-12). In addition, the corrosion-inhibited hypochlorite solutions of the present invention performed at least as well or superior to the two commercial hypochlorite products, Clorox Germicidal Wipes and Caltech Dispatch Wipes.

Example 13

Tests to evaluate the discoloration on metals using corrosion-inhibited hypochlorite solutions in comparison to commercial hypochlorite solutions were conducted. In particular, the improved electrolyzed water products generated according to the methods of the invention were evaluated for reduced discoloration of the treated surfaces according to the following methods.

304 and 316 stainless steel coupons were attached to tiles for easy handling. Four coupons per chemistry were employed to test over extended periods of time (representing applications of use on the treated surface), namely representing 7, 14, 21 and 60 wiping cycle data points (i.e. applying the improved electrolyzed water products in a saturated wipe application). Samples of corrosion inhibited hypochlorite solutions were prepared.

Prior to beginning the tests, the ppm concentrations and pH for each cleaning solution was confirmed. The equal amount of chemistry were placed in sealed jars to completely cover coupons of the applicable metal (i.e. treated surface). Nonwoven log rolls made of Suominen SX-145 were placed into canisters and 400% chemistry was added/loaded into each log roll. The wipes containing the steel coupons were wiped using the chemistries at the defined cycle amounts at room temperature. The coupons were rinsed after each test with deionized water and a paper towel was used to ensure residues were completely removed. The coupons were dried. After each cycle (7, 14, 21 or 60) observations for detecting discoloration were made.

As shown in Table 6, the hypochlorite solution XY-12 (whether a corrosion inhibitor was included or not) outperformed both commercial products.

TABLE 6

Hypochlorite Chemistries Variables

| Chemistry | Corrosion Inhibitor | Hypochlorite (ppm NaOCl) | pH | Discoloration Point 304 SS | 316 SS |
|---|---|---|---|---|---|
| XY-12 | Yes | 800 | 7 | None | None |
| XY-12 | Yes | 6500 | 7 | None | None |
| XY-12 | Yes | 800 | 11 | None | None |
| XY-12 | Yes | 6500 | 11 | None | None |
| XY-12 | No | 6500 | 7 | None | None |
| XY-12 | No | 6500 | 11 | None | None |
| Clorox Bleach Wipes | No | 5200 | 11.74 | 7 Cycles | 7 Cycles |
| Dispatch Bleach Wipes | No | 6500 | 10.13 | 7 Cycles | 7 Cycles |

Example 14

The results from Examples 12 and 13 were combined for further correlation of the combined corrosion and discoloration testing results at a pH range of about 10 to about 12, with 5200-6500 ppm sodium hypochlorite.

Figure 7:
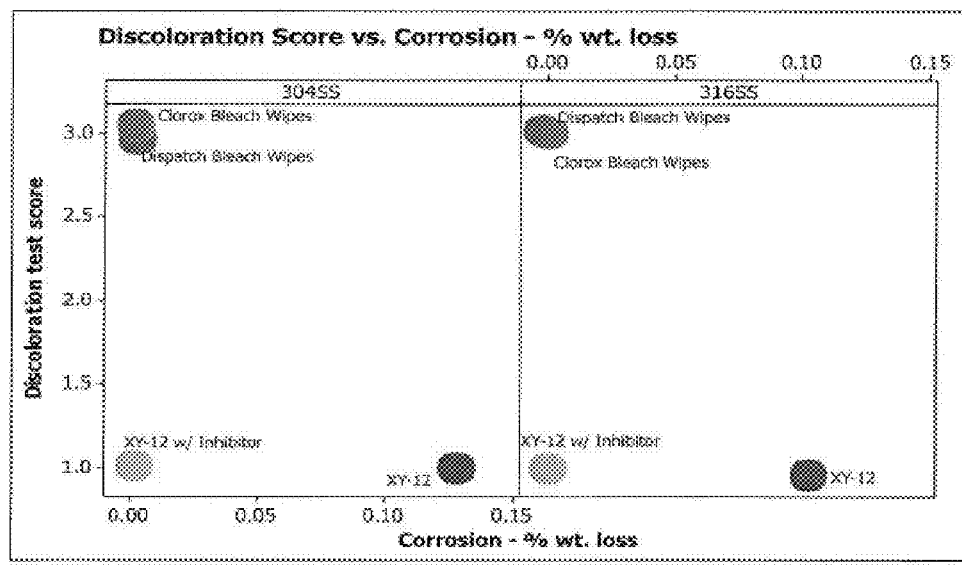
FIG. 7 shows correlation of the bleach corrosion data of Example 12 and the discoloration data of Example 13 demonstrating the efficacy of the corrosion-inhibited hypochlorite solutions of the invention.

As shown in FIG. 7, correlation of the data shows that the hypochlorite solutions of the invention, including the corrosion-inhibited cleaning solutions outperformed commercial products (reflected at bottom of Figure; data points in the lower left hand region of the graph have least amount of discoloration or corrosion). Notably, no discoloration was found on the improved hypochlorite solutions of the invention after 60 cleaning cycles, whereas the commercial products resulted in discoloration at 7 cycles.

Example 15

The corrosion inhibitors according to the invention were analyzed to confirm there is no interference in hypochlorous generation from an electrochemical cell. A brine solution of 15 wt-% NaCl was created in deionized water. Solutions were created with various . additives at varying active material concentrations. The additive solution included 15 wt-% sodium chloride, 0.1 wt-% Acumer, and 84.9 wt-% deionized water.

Figure 8:
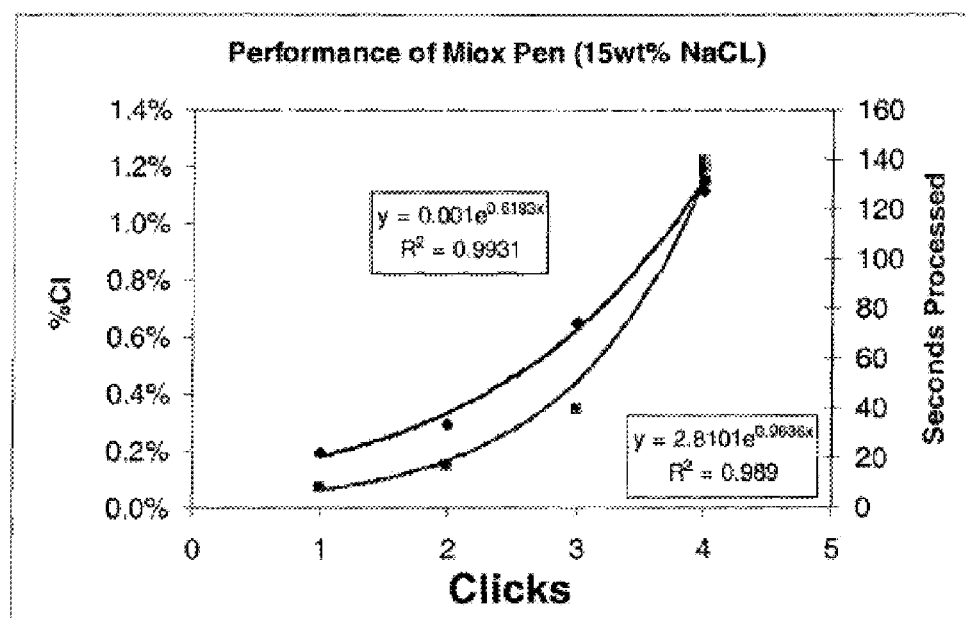
FIG. 8 shows the effects on chlorine generation in a Miox pen relating to time of the reaction.
Figure 9:
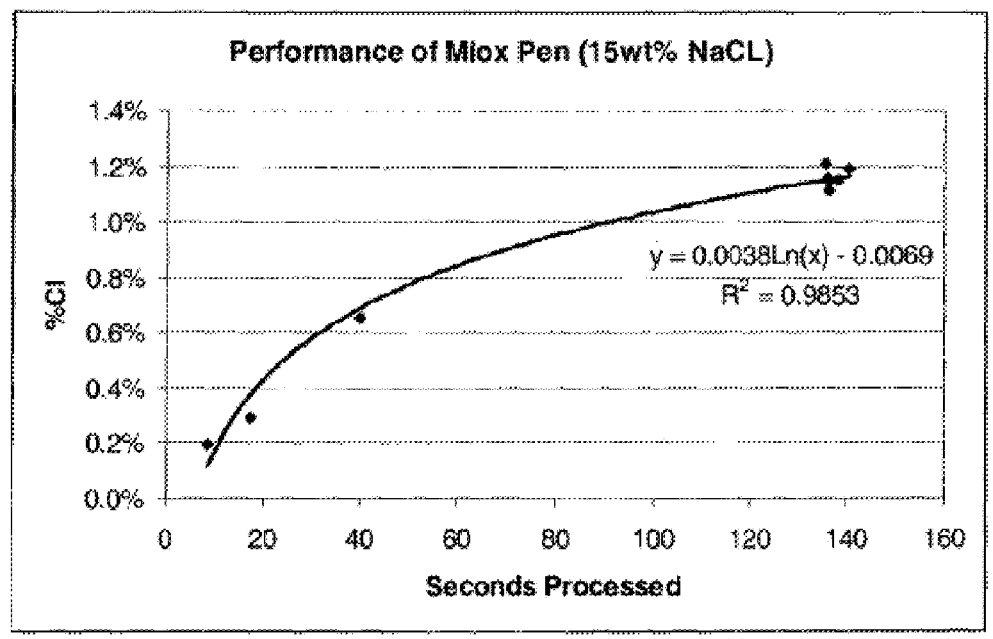
FIG. 9 shows the amount of time required for chlorine generation in a Miox pen, demonstrating the electrochemical conversion of the salt solution into chlorine.

The solutions were then inserted into a Miox pen in the amount of 1.5 mL. The pen was then 'clicked' four times with a click being exponentially proportional to time processed and chlorine generated. The electrolyzed chamber was allowed to generate chlorine and then the solution was collected. Active chlorine was titrated using QATM #007. If there was not enough charge density to perform the electrolysis, the Miox pen would generate an alarm (i.e. low salt) and the reaction terminated. This results in a low processing time and a low active chlorine concentration. FIGS. 8 and 9 show the functioning of the pens as used in this Example. FIG. 8 shows how the number of clicks effects chlorine generation and how it relates to the time the pen processes the solution. There is a good correlation in both of these relationships so it is easy to determine if there are differences when an additive is present. FIG. 9 shows how long the pen takes to process the salt solution to generate the various chlorine concentrations.

A polyacrylate corrosion inhibitor was successfully added (Acumer 1000 (1000 ppm), polyacrylic acid, 48% neutralized) to the Miox pen without inhibiting chlorine generation. The results demonstrated the corrosion inhibitor could be added to the brine solution without inhibiting chlorine generation according to the methods of the invention. Further analysis demonstrates that Acumer ppm could be increased from 1000 ppm to 10,000 ppm while maintaining chlorine generation within the cell.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method for cleaning using a corrosion-inhibited hypochlorous stream from an electrochemical cell comprising:
    adding a corrosion inhibitor to an electrochemical cell or to an effluent stream of an electrochemical cell to generate a corrosion-inhibited hypochlorous concentrate or use solution, wherein said corrosion inhibitor concentration is from about 25 ppm to about 3000 ppm, and wherein said corrosion inhibitor comprises a non-oxidizing water soluble calcium salt and a corrosion inhibitor selected from the group consisting of a water soluble, non-thickening polymeric salt having a molecular weight less than about 10,000, a water soluble zinc salt, and a sugar acid; and
    contacting a surface with said corrosion inhibitor concentrate or use solution, wherein said composition inhibits the corrosion of said surface in the presence of said hypochlorous source.

2. The method according to claim 1, wherein said corrosion inhibitor simultaneously controls corrosive mechanisms of said hypochlorous source which may comprise sodium hypochlorite, sodium chloride, and/or sodium hydroxide, wherein said hypochlorous source is free of carbonate and bicarbonate anions, and wherein said corrosion inhibitor is free of bromide, iodide, aluminum and magnesium.

3. The method according to claim 1, wherein said surface is metal.

4. The method of claim 3, wherein said surface loses less than about 0.1% of its weight in the presence of said corrosion inhibitor.

5. the method of claim 1, further comprising forming a corrosion-inhibiting layer on said surface.

6. A corrosion-inhibited hypochlorous stream from an electrochemical cell comprising:
    a hypochlorous stream, wherein said hypochlorous stream is obtained from an electrochemical cell; and
    a corrosion inhibitor comprising a non-oxidizing water soluble calcium compound and a corrosion inhibitor selected from the group consisting of water soluble polyacrylate compound, water soluble zinc salt and a sugar acid;
    wherein the pH of said composition is at least about 7 and wherein the ratio of said hypochlorous source to corrosion inhibitor is from about 10:1 to about 600:1.

7. The composition according to claim 6, wherein said hypochlorous stream comprises a hypochlorite source, and wherein said hypochlorite source further comprises one or more members selected from the group consisting of sodium chloride, sodium hydroxide and combinations thereof.

8. The composition according to claim 6, wherein said corrosion inhibitor is a polyacrylate compound having a molecular weight less than about 10,000.

9. The composition according to claim 8, wherein said polyacrylate corrosion inhibitor is a water soluble, non-thickening polymeric salt, wherein said salts have a chloride or non-halide anion.

10. The composition according to claim 9, wherein the ratio of said polymeric salt to said calcium salt is from about 6:1 to about 1:6, wherein the molecular weight of said polyacrylate is less than about 7,000, and wherein said polymeric and calcium salts do not contain bromide, iodide, aluminum or magnesium.

11. The composition according to claim 6, wherein said corrosion inhibitor is an EPA approved inert material for antimicrobial formulations and does not adversely impact the stability of the hypochlorite source.

12. A corrosion-inhibited hypochlorous stream from an electrochemical cell comprising:
   a hypochlorous stream, wherein said hypochlorous stream is obtained from an electrochemical cell and comprises sodium hypochlorite, wherein said hypochlorite source is free of carbonate and bicarbonate anions; and
   about 0.01 to about 2 wt-% corrosion inhibitor comprising a non-oxidizing water soluble calcium salt and a corrosion inhibitor selected from the group consisting of a water soluble, non-thickening polymeric salt having a molecular weight less than about 10,000, a water soluble zinc salt, arid a sugar acid;
   wherein the ph of said composition is at least about 7, the ratio of said hypochlorite source to corrosion inhibitor is from about 50:1 to about 200:1, and wherein the ratio of said corrosion inhibitor to said calcium salt is from about 6:1 to about 1:6.

13. The composition according to claim 12, wherein the ratio of said polymeric salt to said calcium salt is from about 4:1 to about 1:4 and wherein the molecular weight of said polymeric salt is less than about 7,000.

14. The composition according to claim 12, wherein the ratio of said zinc salt or said sugar acid to said calcium salt is from about 4:1 to about 1:4.

15. A method for generating corrosion-inhibited bypochlorous source comprising:
   obtaining an electrochemical cell for production of a hypochlorous source;
   providing a water and a sodium chloride source to the electrochemical cell;
   adding a corrosion inhibitor to an electrochemical cell or to an effluent stream of an electrochemical cell to generate is corrosion-inhibited hypochlorous source having a corrosion inhibitor concentration from about 25 ppm to about 3000 ppm, wherein said corrosion inhibitor comprises a non-oxidizing water soluble calcium salt and a corrosion inhibitor selected from the group consisting of a water soluble, non-thickening polymeric salt having a molecular weight less than about 10,000, a water soluble zinc salt, and a sugar acid; and
   applying an electric current to the electrochemical cell.

16. The method of claim 15, wherein said corrosion inhibitor is added to the electrochemical cell as a soluble additive to a feed stream of the cell, as a solid corrosion inhibitor within the cell, or as a solid corrosion inhibitor formulated with the sodium chloride source (e.g. all in one pellet) within the cell.

17. The method of claim 15, further comprising diluting said hypochlorous source to generate a corrosion-inhibited hypochlorous use solution.

18. The method of claim 15, wherein said corrosion inhibitor does not interfere with the electrolysis reaction to generate the hypochlorous source within said electrochemical cell.

19. The method according to claim 15, wherein said corrosion-inhibited hypochlorous source has a corrosion inhibitor concentration from about 25 ppm to about 2000 ppm.

20. The method of claim 15, wherein the pH of said corrosion-inhibited hypochlorous source is at least about 7.

21. The method of claim 15, wherein the electrochemical cell has increased cell longevity in comparison to a cell that does not employ the corrosion inhibitor.

22. The method of claim 15, further comprising adding a threshold agent to the electrochemical cell.

23. The composition according to claim 6, wherein said sugar acid is selected from the group consisting of aldonic acids, ulosonic acids, uronic acids and aldaric acids, and said calcium compound is a water soluble calcium salt with a chloride or non-halide anion.

24. The composition according to claim 6, wherein said sugar acid is ascorbic acid, gluconic acid, galaturonic acid, mucic acid or glucaric acid and said calcium salt is calcium chloride or calcium sulfate.

25. The composition according to claim 6, wherein the ratio of said sugar acid to said calcium salt is from about 6:1 to about 1:6.

* * * * *

UNITED STATES PATENT AND TRADEMARK OFFICE
CERTIFICATE OF CORRECTION

PATENT NO.        : 8,603,392 B2                                Page 1 of 1
APPLICATION NO.   : 13/531775
DATED             : December 10, 2013
INVENTOR(S)       : Jenna Johnson et al.

It is certified that error appears in the above-identified patent and that said Letters Patent is hereby corrected as shown below:

In the Claims

Col. 33, Lines 33-34, Claim 15:
DELETE after corrosion-inhibited "bypochlorous"
ADD after corrosion-inhibited --hypochlorous--

Signed and Sealed this
Twenty-fifth Day of February, 2014

Michelle K. Lee
*Deputy Director of the United States Patent and Trademark Office*